(12) United States Patent
Macfarlane et al.

(10) Patent No.: US 10,314,001 B2
(45) Date of Patent: Jun. 4, 2019

(54) METHOD AND APPARATUS FOR PROVIDING ADAPTIVE LOCATION SAMPLING IN MOBILE DEVICES

(71) Applicant: HERE Global B.V., Eindhoven (NL)

(72) Inventors: Jane Macfarlane, Oakland, CA (US); Bo Xu, Lisle, IL (US)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 15/388,879

(22) Filed: Dec. 22, 2016

(65) Prior Publication Data

US 2018/0184395 A1 Jun. 28, 2018

(51) Int. Cl.
*G01S 5/00* (2006.01)
*G08G 1/00* (2006.01)
*H04W 4/02* (2018.01)
*H04W 4/40* (2018.01)
*G01C 21/00* (2006.01)
(Continued)

(52) U.S. Cl.
CPC .......... *H04W 64/003* (2013.01); *G01C 21/00* (2013.01); *G01S 5/00* (2013.01); *G01S 5/0027* (2013.01); *G08G 1/00* (2013.01); *G01S 19/42* (2013.01); *H04W 4/02* (2013.01); *H04W 4/40* (2018.02)

(58) Field of Classification Search
CPC ...... H04W 64/003; H04L 67/12; H04L 67/18; H04L 67/22
USPC ....................................................... 455/456.1
See application file for complete search history.

(56) References Cited

U.S. PATENT DOCUMENTS 6,385,539 B1 * 5/2002 Wilson .................. G01C 21/30
340/905
7,359,713 B1 4/2008 Tiwari
8,069,203 B2 11/2011 Leiber
(Continued)

FOREIGN PATENT DOCUMENTS

WO 2011107652 A1 9/2011

OTHER PUBLICATIONS

Munishwar et al., "RTChoke: Efficient Real-Time Traffic Chokepoint Detection and Monitoring", 7th International Conference on Communication Systems and Networks (COMSNETS), Dec. 8, 2014, 11 Pages.

(Continued)

*Primary Examiner* — Kamran Afshar
*Assistant Examiner* — Nicole M Louis-Fils
(74) *Attorney, Agent, or Firm* — Ditthavong & Steiner, P.C.

(57) ABSTRACT

An approach is provided for providing adaptive location sampling in mobile devices. The approach involves determining one or more maneuvers from among a plurality of one or more links representing a localized area of a transportation network. Each of the one or more maneuvers is a combination of two or more adjacent links of the one or more links. The approach also involves determining a road length and a speed attribute for each link in said each maneuver. The approach further involves calculating a travel time for said each maneuver based on the road length and the speed attribute of said each link. The approach further involves calculating a sampling interval for the mobile device traveling in the localized area based on the travel time. The mobile device is configured to collect probe data using one or more sensors at the sampling interval while traveling in the localized area.

20 Claims, 16 Drawing Sheets

(51) Int. Cl.
*H04W 64/00* (2009.01)
*G01S 19/42* (2010.01)

(56) References Cited

U.S. PATENT DOCUMENTS

| | | | |
|---|---|---|---|
| 9,161,172 B2 | 10/2015 | Poduri et al. | |
| 9,191,442 B2 | 11/2015 | Kuntagod et al. | |
| 9,212,914 B2 | 12/2015 | Kolar et al. | |
| 9,341,494 B2 | 5/2016 | Kosakowski et al. | |
| 2007/0008184 A1* | 1/2007 | Ho | G07B 15/063 340/941 |
| 2009/0005958 A1* | 1/2009 | Roesser | G08G 1/0104 701/117 |
| 2011/0313648 A1 | 12/2011 | Newson et al. | |
| 2012/0283945 A1* | 11/2012 | Bird | G01C 21/3492 701/420 |
| 2013/0113655 A1* | 5/2013 | Shen | H04W 4/029 342/357.31 |
| 2015/0312863 A1 | 10/2015 | Shen et al. | |
| 2016/0123744 A1* | 5/2016 | Serbanescu | G01C 21/32 701/410 |

OTHER PUBLICATIONS

Quiroga et al., "Travel Time Studies with Global Positioning and Geographic Information Systems: An Integrated Methodology", Transportation Research Part C: Emerging Technologies, Feb. 1998, vol. 6, No. 1-2, pp. 101-127.

\* cited by examiner

150

160

170

180

METHOD AND APPARATUS FOR PROVIDING ADAPTIVE LOCATION SAMPLING IN MOBILE DEVICES

BACKGROUND

Map matching is a process that matches location data (e.g., GPS data) received from a device with a proposed road link on which the device may have traveled. When the location data is sampled over time, map matching can help to reconstruct the travel path taken by the device through a road or other transportation network. Accordingly, map matching generally is a fundamental first step in processing probe data (e.g., location trace data) for many applications—such as traffic analytics, route analytics, behavioral analytics, and the like. In many cases, measurement error and sampling frequency can cause significant difficulties in reconstructing the path that the device took from the probe data. While implementing a high sampling frequency can solve some of these map matching difficulties, it can also result in high battery or power usage over time, particularly in mobile devices such as phones, personal navigation devices (PNDs), Internet-of-things (IoT) devices, and the like. In addition, a sampling frequency that is set too high also can result in collecting, storing, and/or processing large amounts of potentially unnecessary location data. The problem of data overabundance can be further exacerbated when thousands or even millions of devices are collecting probe or location trace data.

SOME EXAMPLE EMBODIMENTS

Therefore, there is a need for an approach for adaptive location sampling in mobile devices.

According to one embodiment, a method for adaptive location sampling in a mobile device, comprises determining one or more maneuvers from among a plurality of one or more links representing a localized area of a transportation network. Each of the one or more maneuvers is a combination of two or more adjacent links of the one or more links. The method also comprises determining a road length and a speed attribute for each link in said each maneuver. The method further comprises calculating a travel time for said each maneuver based on the road length and the speed attribute of said each link. The method further comprises calculating a sampling interval for the mobile device traveling in the localized area based on the travel time. The mobile device is configured to collect probe data using one or more sensors at the sampling interval while traveling in the localized area.

According to another embodiment, an apparatus for adaptive location sampling in a mobile device, comprises at least one processor, and at least one memory including computer program code for one or more computer programs, the at least one memory and the computer program code configured to, with the at least one processor, cause, at least in part, the apparatus to determine one or more maneuvers from among a plurality of one or more links representing a localized area of a transportation network. Each of the one or more maneuvers is a combination of two or more adjacent links of the one or more links. The apparatus is also caused to determine a road length and a speed attribute for each link in said each maneuver. The apparatus is further caused to calculate a travel time for said each maneuver based on the road length and the speed attribute of said each link. The apparatus is further caused to calculate a sampling interval for the mobile device traveling in the localized area based on the travel time. The mobile device is configured to collect probe data using one or more sensors at the sampling interval while traveling in the localized area.

According to another embodiment, a non-transitory computer-readable storage medium for adaptive location sampling in a mobile device, carries one or more sequences of one or more instructions which, when executed by one or more processors, cause, at least in part, an apparatus to determine one or more maneuvers from among a plurality of one or more links representing a localized area of a transportation network. Each of the one or more maneuvers is a combination of two or more adjacent links of the one or more links. The apparatus is also caused to determine a road length and a speed attribute for each link in said each maneuver. The apparatus is further caused to calculate a travel time for said each maneuver based on the road length and the speed attribute of said each link. The apparatus is further caused to calculate a sampling interval for the mobile device traveling in the localized area based on the travel time. The mobile device is configured to collect probe data using one or more sensors at the sampling interval while traveling in the localized area.

According to another embodiment, an apparatus for adaptive location sampling in a mobile device, comprises means for determining one or more maneuvers from among a plurality of one or more links representing a localized area of a transportation network. Each of the one or more maneuvers is a combination of two or more adjacent links of the one or more links. The apparatus also comprises means for determining a road length and a speed attribute for each link in said each maneuver. The road density represents a length of said each link. The apparatus also comprise means for calculating a travel time for said each link based on the road length and the speed attribute. The apparatus further comprises means for calculating a sampling interval for the mobile device traveling in the localized area based on the travel time. The mobile device is configured to collect probe data using one or more sensors at the sampling interval while traveling in the localized area.

According to one embodiment, a method for adaptive location sampling in a mobile device, comprises determining an ordered pair of nodes within a graph representing a localized area of a transportation network. The method also comprises determining respective road lengths and respective speed attributes for one or more links connecting the ordered pair of nodes. The method further comprises calculating respective travel times for one or more paths traversing the one or more links based on the respective road lengths and the respective speed attributes. The method further comprises determining a second shortest path from among the one or more paths that is associated with a second shortest travel time among the calculated respective travel times. The method further comprises calculating a sampling interval for the mobile device traveling in the localized area based on the second shortest travel time. The mobile device is configured to collect probe data using one or more sensors at the sampling interval while traveling in the localized area.

According to another embodiment, an apparatus for adaptive location sampling in a mobile device, comprises at least one processor, and at least one memory including computer program code for one or more computer programs, the at least one memory and the computer program code configured to, with the at least one processor, cause, at least in part, the apparatus to determine an ordered pair of nodes within a graph representing a localized area of a transportation network. The apparatus is also caused to determine respective road lengths and respective speed attributes for one or more links connecting the ordered pair of nodes. The apparatus is further caused to calculate respective travel times for one or more paths traversing the one or more links based on the respective road lengths and the respective speed attributes. The apparatus is further caused to determine a second shortest path from among the one or more paths that is associated with a second shortest travel time among the calculated respective travel times. The apparatus is further caused to calculate a sampling interval for the mobile device traveling in the localized area based on the second shortest travel time. The mobile device is configured to collect probe data using one or more sensors at the sampling interval while traveling in the localized area.

According to another embodiment, a non-transitory computer-readable storage medium for adaptive location sampling in a mobile device, carries one or more sequences of one or more instructions which, when executed by one or more processors, cause, at least in part, an apparatus to determine an ordered pair of nodes within a graph representing a localized area of a transportation network. The apparatus is also caused to determine respective road lengths and respective speed attributes for one or more links connecting the ordered pair of nodes. The apparatus is further caused to calculate respective travel times for one or more paths traversing the one or more links based on the respective road lengths and the respective speed attributes. The apparatus is further caused to determine a second shortest path from among the one or more paths that is associated with a second shortest travel time among the calculated respective travel times. The apparatus is further caused to calculate a sampling interval for the mobile device traveling in the localized area based on the second shortest travel time. The mobile device is configured to collect probe data using one or more sensors at the sampling interval while traveling in the localized area.

According to another embodiment, an apparatus for adaptive location sampling in a mobile device, comprises means for determining an ordered pair of nodes within a graph representing a localized area of a transportation network. The apparatus also comprises means for determining respective road lengths and respective speed attributes for one or more links connecting the ordered pair of nodes. The apparatus further comprises means for calculating respective travel times for one or more paths traversing the one or more links based on the respective road lengths and the respective speed attributes. The apparatus further comprises means for determining a second shortest path from among the one or more paths that is associated with a second shortest travel time among the calculated respective travel times. The apparatus further comprises means for calculating a sampling interval for the mobile device traveling in the localized area based on the second shortest travel time. The mobile device is configured to collect probe data using one or more sensors at the sampling interval while traveling in the localized area.

According to another embodiment, a method for adaptive location sampling in a mobile device, comprises detecting that the mobile device is traveling in a localized area of a transportation network. The method also comprises adjusting a sampling interval based on the localized area or a portion thereof. The method further comprises configuring the mobile device to collect probe data using the sampling interval while traveling in the localized area.

According to another embodiment, an apparatus for adaptive location sampling in a mobile device, comprises at least one processor, and at least one memory including computer program code for one or more computer programs, the at least one memory and the computer program code configured to, with the at least one processor, cause, at least in part, the apparatus to detect that the mobile device is traveling in a localized area of a transportation network. The apparatus is also caused to adjust a sampling interval based the localized area or a portion thereof. The apparatus is further caused to configure the mobile device to collect probe data using the sampling interval while traveling in the localized area.

According to another embodiment, a non-transitory computer-readable storage medium for adaptive location sampling in a mobile device, carries one or more sequences of one or more instructions which, when executed by one or more processors, cause, at least in part, an apparatus to detect that the mobile device is traveling in a localized area of a transportation network. The apparatus is also caused to adjust a sampling interval based on the localized area or a portion thereof. The apparatus is further caused to configure the mobile device to collect probe data using the sampling interval while traveling in the localized area.

According to another embodiment, an apparatus comprises means for detecting that the mobile device is traveling in a localized area of a transportation network. The apparatus also comprises means for adjusting a sampling interval based on the localized area or a portion thereof. The apparatus further comprises means for configuring the mobile device to collect probe data using the sampling interval while traveling in the localized area.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing adaptive location sampling in a mobile device are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As discussed above, many current map matching algorithms have inherent deficiencies. For example, point-based map matchers typically do not use knowledge of localized points to aid in map matching. Meanwhile, trajectory-based and global map matchers use past locations and future locations of location points of a device or probe to infer the location of a given location point in probe data or a location trace. As such, map matches using these traditional processes often determine a probability that a device or probe took a path. Accordingly, they all tend to fail in difficult geometries where data sparseness and/or measurement error can lead the algorithm to the wrong conclusion (e.g., by mapping to a wrong path within a transportation network). These approaches can be problematic because they are focused on making sense of location trace data from devices that already have a fixed sampling period that can result in significant problems for path reconstruction—e.g., when the sampling period is too low and generates sparse data points.

Figure 1A:
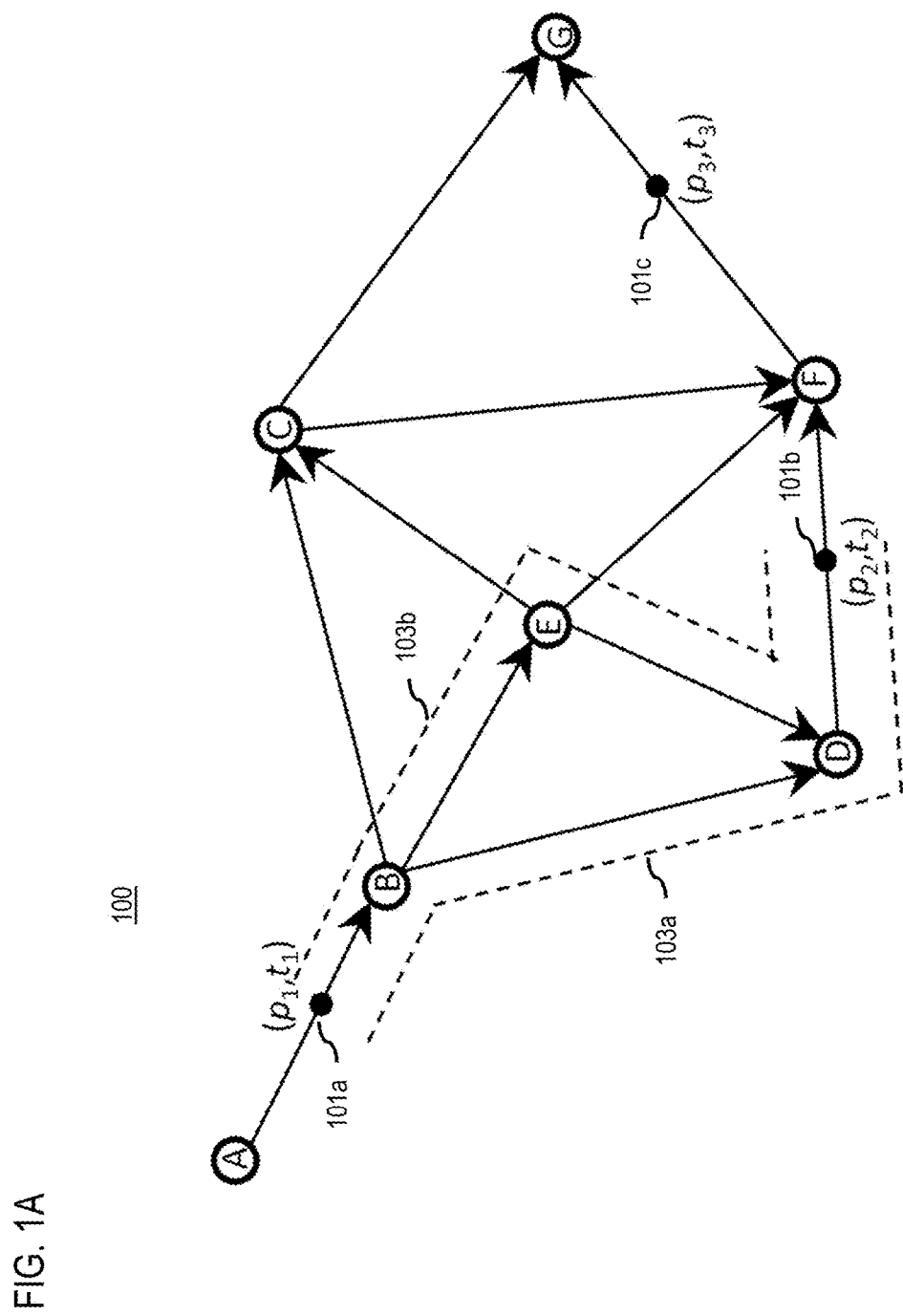
FIGS. 1A-1H are diagrams of graphs representing a localized area of a transportation network for calculating an adaptive sampling interval, according to various embodiments.

FIG. 1A is a diagram of a graph 100 representing a localized area of a transportation network, according to one embodiment. The graph 100 illustrates the effect of data sparseness on whether a path of a device can be accurately map matched or determined from collected location trace data. As shown, the graph 100 represents a localized area of a transportation network (e.g., a road network) in terms of nodes and links. By way of example, each node within the graph represents a location point (e.g., latitude and longitude coordinates), and each link represents a road or travel segment between the nodes. The nodes and links are defined according to the geospatial arrangement of the transportation or road network that they represent. In one embodiment, the graph 100 is a simple directed graph G=(V, L), where V is a set of all nodes in the localized area (e.g., nodes A through G as shown in the graph 100), and L is a set of all links between the nodes of the localized area. As shown, the links are directional according to the depicted direction of arrow of each link representation.

A location trace of a mobile device (e.g., a probe) traveling the transportation network of the graph 100 is expressed as a sequence of location points 101a-101c (also collectively referred to as location points 101). Each location point 101a-101c is respectively represented by $(p_1, t_1)$, $(p_2, t_2), \ldots, (p_n, t_n)$ where $p_1$-$p_n$ indicate locations of the device at each time $t_1$-$t_n$, and where $t_1 < t_2 < \ldots < t_n$. In one embodiment, the time different between two consecutive locations points 101 is referred to as a sample interval.

Now consider the problem of reconstructing the traveled path from the location trace comprising location points 101a-101c. For the time period from $t_2$ to $t_3$, it is clear that the device or probe must have traveled along the path $p_2 \rightarrow F \rightarrow p_3$ because this is the only path from $p_2$ to $p_3$. For the time period from $t_1$ to $t_2$, on the other hand, it is not clear which path the probe has traveled because there is no sampled location point in the location trace that can disambiguate the path taken by the probe. Based on the location trace, the probe could have traveled along the path 103a represented by $p_1 \rightarrow B \rightarrow D \rightarrow p_2$ or the path 103b represented by $p_1 \rightarrow B \rightarrow E \rightarrow D \rightarrow p_2$.

A potential solution to the problem is to increase the sampling frequency by reducing the sampling interval between location points. In one embodiment, the sampling interval is a period time between (e.g., expressed in a time unit such as a second, minute, etc.) collecting one location point and a subsequent location point. It is noted that, the sampling interval can also be expressed as a number of samples to collect per unit of time, as opposed to a time interval between samples. However, globally increasing the sampling frequency can result in creating potentially unnecessary location points that would impose an unnecessary resource burden to collect, store, and/or process. For example, while globally increasing the sampling frequency can potentially add extra location points between location point 101a and 101b to disambiguate the path to allow unambiguous path reconstruction, it would also add extra location points between location points 101b and 101c. Any extra location point(s) between location points 101b and 101c would be unnecessary for path reconstruction because the path between those points was not ambiguous. Accordingly, the extra location points would result in unnecessarily increasing battery consumption and resource usage (e.g., memory, bandwidth, and/or processing resources) needed to collect, store, and process the additional points.

Figure 2:
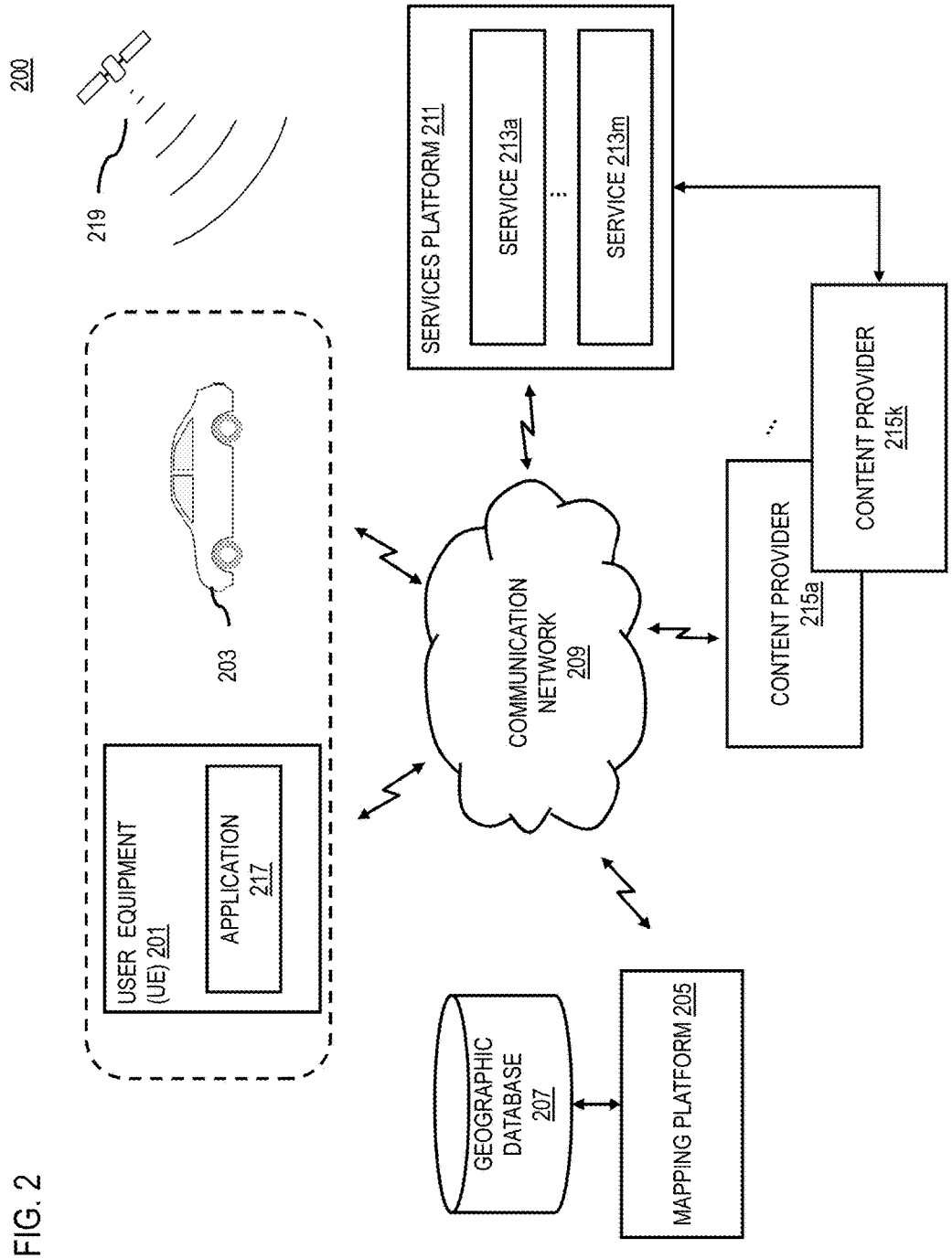
FIG. 2 is a diagram of a system for providing adaptive location sampling in a mobile device, according to one embodiment.

To address this problem, a system 200 as shown in FIG. 2 introduces a capability to use road density information (e.g., a length of road link) and a speed attributes (e.g., a speed limit, a free-flow speed, a maximum observed speed, an upper percentile speed, etc.) of links in a localized area of a transportation network to calculate a sampling interval that is adaptively localized to the area in which a device or probe is traveling. Examples of such a device or probe include but are not limited to user equipment (UE) 201 (e.g., mobile devices, personal navigation devices (PNDs), Internet-of-things (IoT) devices, etc.) and or vehicles 203 that are traveling in the localized area. In one embodiment, the sampling interval is then used to adaptively change the sampling period or frequency of that the device uses to collect location trace data (e.g., a sequence of locations and times as described above).

In one embodiment, the system 200 uses road density information and speed attributes for links of interest to determine an optimal sampling period at each node or link or a localized area. The optimal sampling, for instance, is the minimum sampling frequency (or maximum sampling interval) at which the path of the device collecting the location trace data remains unambiguously reconstructable to guarantee path reconstruction. In one embodiment, a transportation network (e.g., a road network, pedestrian path network, rail network, and/or a combination thereof) or a localized area of the transportation network is defined as path-reconstructable with a particular sample interval I if a path can be reconstructed for any location trace (e.g., a GPS trace) falling on that road network collected using the sample interval I. In other words, the system 200 uses the knowledge of the map and the speed attribute for the road links to define a base sampling period that is to be used in the geospatial area in which the device is located.

By using the sampling period as determined according to the various embodiments described herein, a device can sample probe or location trace data according to the localized area and advantageously use the least amount of power for reconstructing its path. In addition, big data analytics (e.g., involving large data sets) is becoming a concern for many organizations collecting device data (e.g., IoT data, probe data, mobile device data, etc.). For example, as previously noted, big data incurs significant costs and impose significant resource burdens to store and analyze, and is often significantly over sampled (e.g., have higher data densities needed for a given application). In one embodiment, if path reconstruction is the main purpose of an application (e.g., when mobility data is the focus of the analytics), the system 200 can generate adaptive sampling intervals that will advantageously provide the least amount of data necessary, thereby reducing the amount and cost of storage, bandwidth, computing resources, etc. needed to process the data.

In one embodiment, the system 200 calculates the sample interval for devices collecting probe or location trace data in a localized area based on a travel time computed from the road density (e.g., link length) and speed attribute for each link. The road density and speed attribute and the associated links and nodes can be determined from a geographic database 207. The road density, for instance, represents a physical length of each road link. The speed attribute indicates an expected travel speed of devices traveling a particular link. For example, the speed attribute can be a speed limit specified for each road link. In another example, the speed attribute can be based on historical speed data (e.g., an observed free-flow speed, an average speed, a speed observed at a particular percentile, etc.).

More specifically, for each link (u,v) where u is a starting node and v is the ending node of the link, the system 200 determines a road density and a speed attribute to compute a travel time (e.g., travel time=road density/speed attribute) for traversing the link. In one embodiment, when the speed attribute is a speed limit or other expected maximum speed of a device, the travel time is defined as a minimum travel time (MTT) for the link, which can be denoted as MTT(u,v). It is noted that MTT is a combination of road density (e.g., link length) and speed attribute, and not density and speed attribute individually. It is noted that the travel time and MTT are used interchangeably in the embodiments described herein.

Given a pair of consecutive sampled location points, it may or may not be possible to determine for sure which path has been traveled if the sampling interval is not optimized for path reconstruction. For example, referring back to graph 100 of FIG. 1, an example scenario may assume the following: (1) the MTT of link (B,D) is very small (e.g., the link is a highway with a high speed limit); and (2) the MTTs of links (B,E) and (E,D) are very large (e.g., they are pedestrian-automobile shared streets with low speed limits). In a case where $t_2-t_1$ is very small, it may be possible to disambiguate the path from location point 101a to location point 101b because it would be infeasible for the probe to travel from location point 101a to location point in a short period of time. Thus, the path 103b (e.g., via B, E, D) can be excluded and it can be determined that the travel path from location point 101a to location point 101b is path 103a represented by $p_1 \rightarrow B \rightarrow D \rightarrow p_2$. However, if $t_2-t_1$ is very large, then the path 103a (e.g., via B, E, D) cannot be excluded. The path 103b (e.g., via B, D) cannot be excluded either, because the long delay $t_2-t_1$ may have been caused by heavy congestion at link (B,D). In this case, the path from location point 101a to location point 101b cannot be reconstructed because of data sparseness.

Accordingly, in one embodiment, the system 200 calculates the sampling interval to be less than a minimal of travel times computed for combinations of two adjacent links in the localized area of the transportation to guarantee path reconstruction. The combination of two adjacent links is referred to as a maneuver. A transportation network or a localized area of the transportation network is path-reconstructable when the sample interval is smaller than the minimal MTT calculated for maneuvers in a transportation network or a localized area of the transportation network. An example of this embodiment is discussed with respect a simple road network as illustrated in FIG. 1B which is a diagram of an example graph 120 for calculating an adaptive sampling interval, according to one embodiment.

Figure 1B:
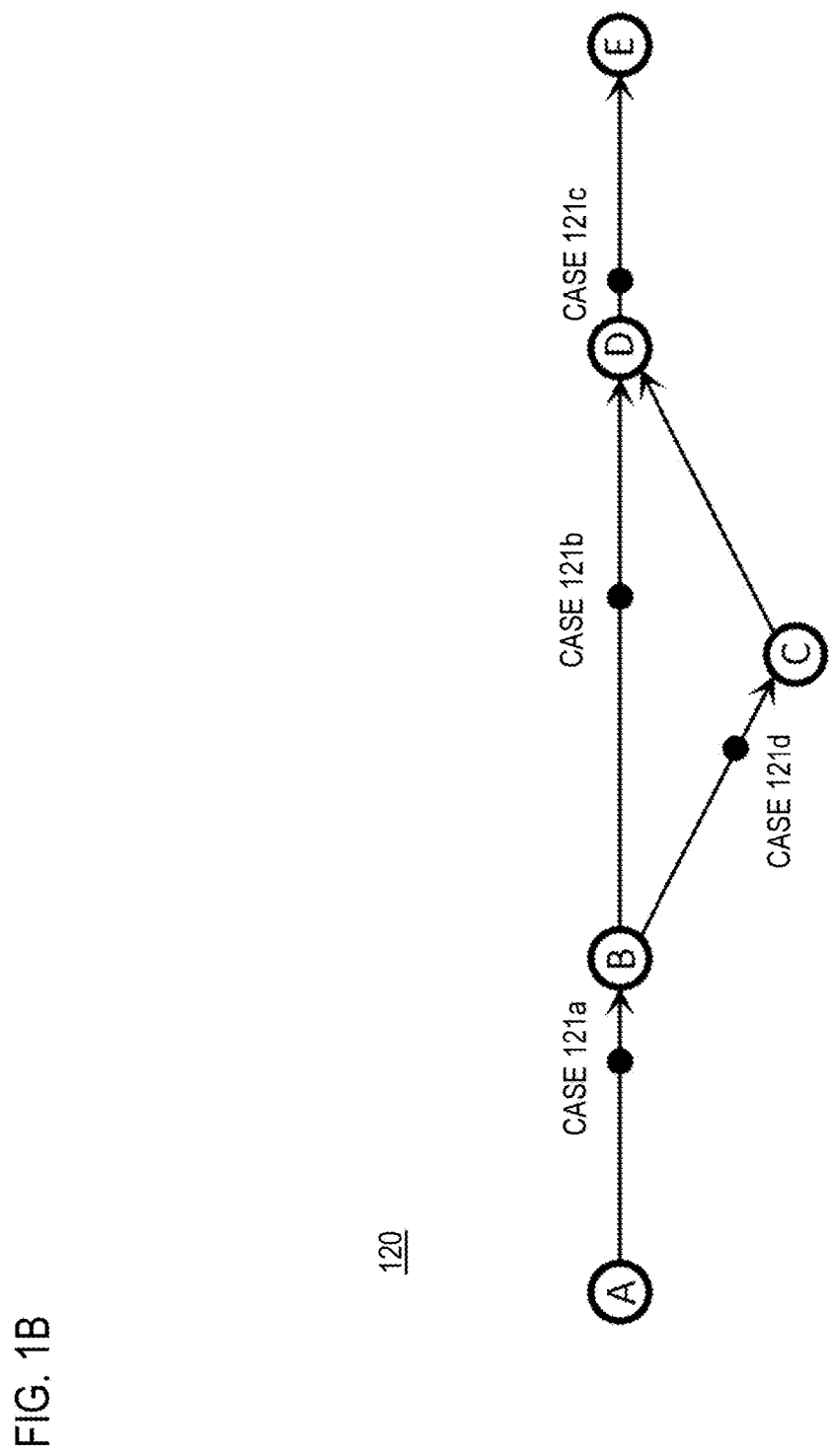

As shown in FIG. 1B, the road network represented in the directed graph 120 is path-reconstructable when the sample interval is smaller than MTT(B,C)+MTT(C,D). For example, consider a pair of consecutive location points $(p_1,t_1)$ and $(p_2,t_2)$ where $t_2-t_1<$MTT(B,C)+MTT(C,D). There are four possible cases 121a-121d illustrated in FIG. 1B depending on the position of $p_1$:

(1) Case 121a: $p_1$ is on link (B,D). In this case there is a unique path from $p_1$ to $p_2$ regardless of where $p_2$ is ($p_2$ can be at either link (B,D) or link (D,E)). Thus the path is reconstructable.
(2) Case 121b: $p_1$ is on link (B,C) or link(C,D). The path is reconstructable.
(3) Case 121c: $p_1$ is on link (D,E). The path is reconstructable.
(4) Case 121d: $p_1$ is on link (A,B). In this case, if $p_2$ is on link (B,D) or (B,C) or (C,D), then there is a unique path from $p_1$ to $p_2$. If $p_2$ is on link (D,E), there are two possible paths from $p_1$ to $p_2$, namely via B,C,D or B,D. However, since $t_2-t_1<$MTT(B,C)+MTT(C,D), the path via B,C,D is not feasible. Therefore the traveled path must be $p_1 \rightarrow B \rightarrow D \rightarrow p_2$.

Figure 1C:
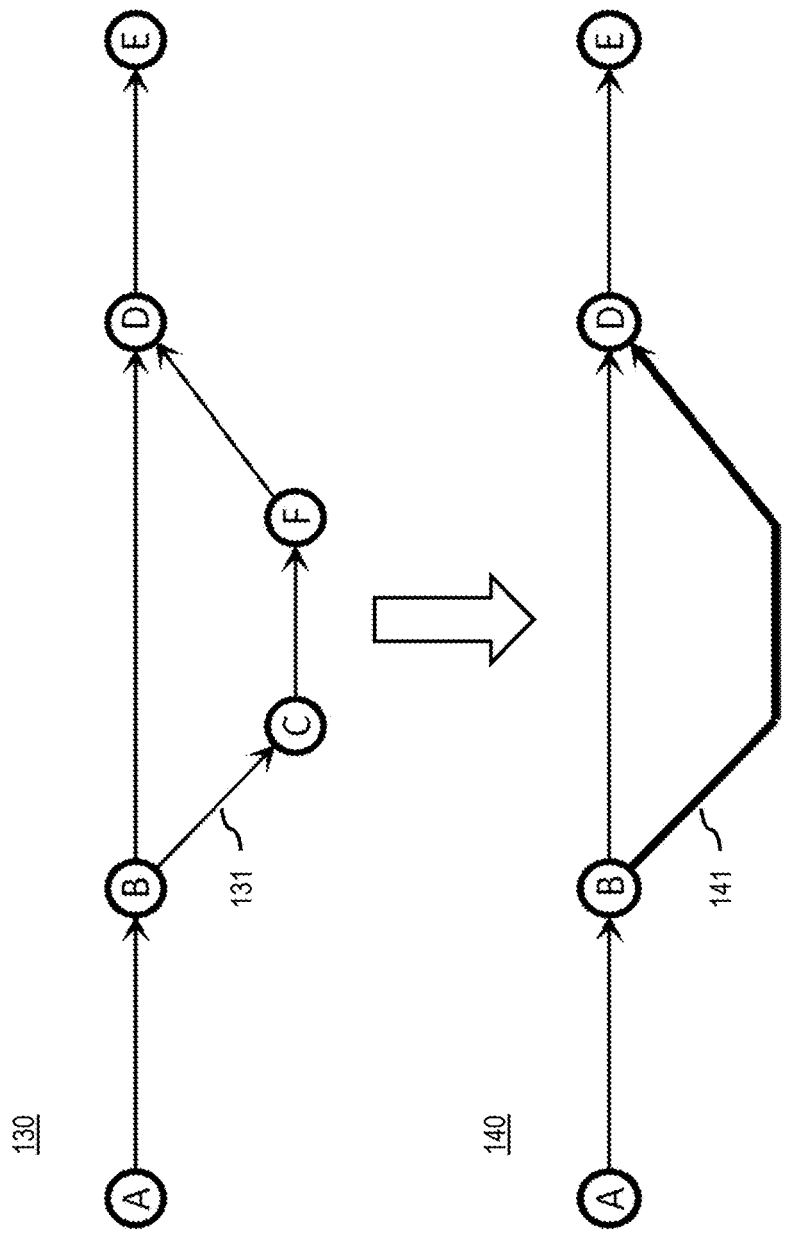

FIG. 1C illustrates a graph 130 representing the same road network as shown in FIG. 1B except that a node F is added between C and D. Following the logic discussed with the respect to the cases 121a-121d of FIG. 1B, it can also be shown that the road network in the graph 130 of FIG. 1C is path-reconstructable if the sample interval is smaller than MTT(B,C)+MTT(C,F)+MTT(F,D).

From the analysis of FIGS. 1B and 1C, there are two insights. First, the sample interval required for unambiguous path reconstruction has something to do with turns or maneuvers, such as the turn from link (B,C) to link (C,D). Accordingly, in one embodiment, the system 200 can define sampling intervals on the basis of turns or maneuvers available within a localized area of the transportation network.

Second, in some cases, a link chain (e.g., a sequence of adjacent links) may be combined without affecting the topology of the graph. For example, the link chain (B,C), (C,F), (F,D) may be combined to a single link without affecting the analysis as described above. Accordingly, the system 200 can optionally combine a link chain into a super link to calculate an adaptive sample interval. For example, let $(v_1, v_2), (v_2, v_3), \ldots, (v_{n-1}, v_n)$ be a link chain, where $v_1$ $v_n$ are nodes defining the respective links. In one embodiment, the link chain is combinable if the two conditions are satisfied. First, for both $v_1$ and $v_n$, their degree of freedom is 1 or greater than 2. The degree of freedom, for instance, is the total number incoming or outgoing links at the node. In other words, $v_1$ is either a node without any incoming link or an intersection node, and $v_n$ is either a node without any outgoing link or an intersection node. Second, for $v_2, \ldots, v_{n-1}$, their degree is exactly 2. In other words, $v_2, \ldots, v_{n-1}$ are not intersection nodes. A super link is a combinable link chain with the intermediate nodes removed but with the link geometries preserved. To distinguish the super link from non-super links, a link that exists in the original graph is referred to as a regular link. In one embodiment, the MTT of a super link is the total MTT of all links that constitute it. A combined graph of G, denoted C(G), is the graph G with all combinable link chains replaced by super links.

As shown in FIG. 1C, the link chain 131 of graph 130 comprising links between B, C, F, and D is combinable into a super link 141 as shown in combined graph 140 of FIG. 1C. This is because the link chain 141 meets the two criteria for combining: (1) the starting node B and ending node D of link chain 141 are intersection nodes with degrees of freedom greater than 2; and (2) the nodes C and F of the link chain 141 are non-intersection nodes with degrees of freedom equal to 2.

After optionally combining regular links into super links, the system 200 identifies potential maneuvers according to the first insight discussed above. In one embodiment, a maneuver is defined as follows: let u,v,w be three nodes of a combined road network such that there is a regular or super link from u to v and a regular or super link from v to w. The ordered triple (u,v,w) and the links between them define a maneuver. In one embodiment, it is allowed that u=w (in which case maneuver (u,v,w) is a U-turn). The minimum travel time of the maneuver, denoted MTT(u,v,w), is defined to be MTT(u,v,w)=MTT(u,v)+MTT(v,w). In other words, MTT(u,v,w) is the minimum travel time for a probe or device to travel from u to w via v.

In one embodiment, the system 200 calculates the sample interval to be smaller than the minimal of the travel times or MTTs of all maneuvers and/or super links (e.g., if links are combined) in a combined graph representing a transportation network or a localized area of the transportation network. In other words, a road network represented by a graph G is path-reconstructable when the sample interval is smaller than the minimal of the MTTs of all maneuvers and super links in the combined graph G, or C(G).

Figure 1D:
Figure 1E:
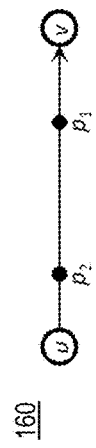

FIGS. 1D-1G illustrate three example use cases of calculating an adaptive sampling interval as the minimal of the MTTs of all maneuvers and super links. Each of the three uses cases assumes two location points $(p_1,t_1)$ and $(p_2,t_2)$ with $t_2>t_1$. FIGS. 1D and 1E illustrate a use case where $p_1$ and $p_2$ fall onto the same link (u,v) in the combined graph. There are two subcases with graph 150 of FIG. 1D illustrating a subcase where $p_2$ is ahead of $p_1$ and graph 160 of FIG. 1E illustrating a subcase where $p_2$ is behind $p_1$. In the subcase of graph 150 where $p_2$ is ahead of $p_1$, there are two possibilities in terms of the traveled path. One is that the probe arrives at $p_2$ at $t_2$ before reaching v. The other is that the probe reaches v before $t_2$ and then arrives at $p_2$ at $t_2$ after traveling from v to u. However, the second possibility requires that the probe travels at least one complete maneuver starting with link (u,v). This is not feasible because $t_2-t_1$ is smaller than the MTT of any maneuver. Thus the only feasible path is from $p_1$ to $p_2$ without going out of node v, and the path is reconstructable.

In the subcase of graph 160 where $p_2$ is behind $p_1$. The probe must have traveled from v to u. Because $t_2-t_1$ is smaller than the MTT of any super link or maneuver from v to u, the only feasible path is the regular link from v to u. Thus, the path is reconstructable.

Figure 1F:
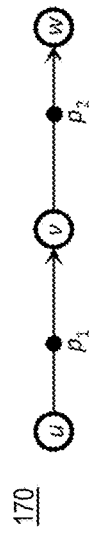

As shown in FIG. 1F, a graph 170 illustrates a second case where $p_1$ and $p_2$ fall onto two consecutive links (u,v) and (v,w), respectively. In this case, there is no link originating at and ending at v. So if the probe travels a path from v to v, the path must include at least one maneuver or one super link. Because $t_2-t_1$ is smaller than any maneuver or super link from v to v, the only feasible path is from $p_1$ to $p_2$ directly. Thus, the path is reconstructable.

Figure 1G:

As shown in FIG. 1G, a graph 180 illustrates a third case where $p_1$ and $p_2$ fall onto two links (u,v) and (w,x) respectively, and where vow. Because $t_2-t_1$ is smaller than any maneuver or super link from v to w, the only feasible path is via link (v,w). Thus, the path is reconstructable.

Accordingly, in each of the three cases resulting from setting the sampling interval to less than the minimal of the travel times or MTTs of all maneuvers and/or super links, the path of the device collecting the probe or location trace data is reconstructable.

In one embodiment, in a transportation network in which the road links from a perfect grid network (e.g., a network in which links are of equal length or road density), paths are reconstructable if the sample interval is smaller than the MTT of a maneuver. Specifically, if the density of the network is L distance units per street block and the speed limit is S for all street blocks, then paths are reconstructable if the sample interval is smaller than 2L/S.

In one embodiment, the system 200 introduces a determinant MTT from which a sampling interval can be calculated. By way of example, the determinant MTT is calculated for an ordered pair of nodes (u,v) (u,v∈V), denoted DMTT(u,v). Nodes u and v are in the set of V nodes representing a transportation network or a localized area of the transportation network. In addition nodes u and v do not have to be adjacent, nor do they have to be different. The determinant MTT can be calculated for two cases: (i) u≠v, and (ii) u=v. For the case where u≠v, if there is no path or only one path from u to v, then DMTT(u,v) is undefined or not applicable. If there is more than one path from u to v, then DMTT(u,v) is the MTT cost of the second shortest path from u to v. For the case where u=v, if there is no path from u to itself, then DMTT(u,u) is undefined or not applicable. Otherwise, DMTT(u,v) is the MTT cost of the shortest path from u to itself. In one embodiment, the links with the graph of the network or localized area are weighted by their respective MTTs, and the sum of the weights (e.g., the sum of the MTTs) along a path from a node u to a node v is the MTT cost of the path.

In one embodiment, the system 200 calculates the adaptive sampling interval to be smaller than the minimal of MTT costs for all ordered pairs of nodes in a graph, denoted as $\min_{u \in V, v \in V}(DMTT(u,v))$. This path reconstructability can be illustrated in an example use case comprising two location points $(p_1, t_1)$ and $(p_2, t_2)$ where $t_2 > t_1$. Under this use case, there are three possible cases for path reconstructability.

In Case 1, $p_1$ and $p_2$ fall onto the same link (u,v) in the combined graph, which further leads to two possible subcases. In the first subcase, $p_2$ is ahead of $p_1$. There are two possibilities. One is that the probe arrives at $p_2$ at $t_2$ before reaching v. The other is that the probe reaches v before $t_2$ and then arrives at $p_2$ at $t_2$ after traveling from v to u. However, observe that the second possibility requires that the probe travels at least one complete path from u to itself. This is not feasible because $t_2-t_1$ is smaller than MTT(u,u) (recall that MTT(u,u) is defined to be the MTT cost of the shortest path from u to itself). Thus, the only feasible path is from $p_1$ to $p_2$ without going out of node v. Accordingly, the path is reconstructable.

In the second subcase of the Case 1, $p_2$ is behind $p_1$. The probe must have traveled from v to u. Because $t_2-t_1$ is smaller than the MTT cost of the second shortest path from v to u when the sampling rate is smaller than $\min_{u \in V, v \in V}$ (DMTT(u,v)), the only feasible path is the shortest path from v to u. Thus, the path is reconstructable.

In Case 2, $p_1$ and $p_2$ fall onto two consecutive links (u,v) and (v,w), respectively. Notice that there is no link originating at v and ending at v. So if the probe travels a path from v to v, the path must include at least one maneuver or one super link. Because $t_2-t_1$ is smaller than MTT(v,v) when the sampling rate is smaller than $\min_{u \in v, v \in v}(DMTT(u,v))$, the only feasible path is from $p_1$ to $p_2$ directly. Thus, the path is reconstructable.

In Case 3, $p_1$ and $p_2$ fall onto two links (u,v) and (w,x) respectively where Because $t_2-t_1$ is smaller than the MTT cost of the second shortest path from v to w when the sampling rate is smaller than $\min_{u \in V, v \in V}(DMTT(u,v))$, the only feasible path is the shortest path from v tow. Thus, the path is reconstructable.

In one embodiment, the sample interval being smaller than $\min_{u \in v, v \in v}(DMTT(u,v))$ is a necessary condition for a road network to be path-reconstructable. In other words, given a road network graph G, if the sample interval is not smaller than $\min_{u \in v, v \in v}(DMTT(u,v))$, then G is not path-reconstructable. This can be illustrated in an example where there is a node pair (x,y) such that $$DMTT(x, y) = \min_{u \in V, v \in V} (DMTT(u, v)).$$

In this example, $(p_1, t_1)$ and $(p_2, t_2)$ are two location points and $t_2-t_1 \geq MTT(x,y)$. There are two cases to consider, depending on whether x=y or not. In each case, there is a configuration of $p_1$ and $p_2$ such that a path is not constructable, and therefore the sample interval being smaller than $\min_{u \in v, v \in v}(DMTT(u,v))$ is a necessary condition for a road network to be path-reconstructable.

For example, in Case 1 where x=y, let $p_1=p_2=x$. Because $t_2-t_1 \geq MTT(x,x)$, it is impossible to determine whether the probe has traveled a path from x to itself or it has stayed at x from $t_1$ to $t_2$. Thus, the path is not reconstructable.

In Case 2 where x≠y. Let $p_1=x$ and $p_2=y$. Because $t_2-t_1 \geq MTT(x,y)$ and MTT(x,y) is the MTT cost of the second shortest path from x to y, it is impossible to determine whether the probe has traveled along the shortest path or the second shortest path from x toy. Thus, the path is not reconstructable.

From the discussion above, in one embodiment, the system 200 can calculate an adaptive sampling interval using at least two approaches: (1) calculating the sampling interval to be smaller than the minimal of the MTTs or travel times of all maneuvers and/or super links in a transportation network graph; and (2) calculating the sampling interval to be smaller than the minimal of MTT costs for all ordered pairs of nodes in a graph, $\min_{u \in v, v \in v}(DMTT(u,v))$.

In one embodiment, the system 200 can determine which approach to use based on desired relaxness of the resulting sampling interval weighed against resource usage. In general, the first approach is less computationally complex than the second approach, but the second approach yields potentially more relaxed sampling intervals (e.g., longer sampling intervals that still maintain path reconstructability). In other words, the condition given in the second approach is sufficient and necessary, whereas the condition given in first approach is only sufficient. Thus, the second approach 2 provides a more relaxed requirement on the sample interval.

Figure 1H:
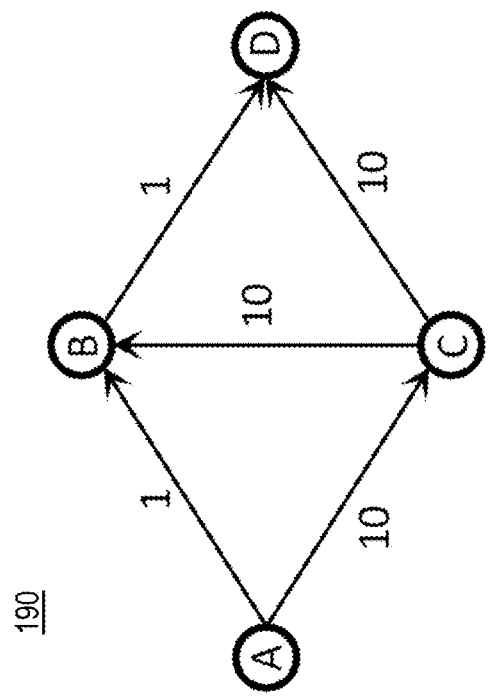

FIG. 1H is a diagram of a transportation network graph 190 that illustrates the difference between the two approaches for calculating an adaptive sampling interval, according to one embodiment. As shown, the graph 190 comprises nodes A through D with respective road links connecting the nodes as shown. The MTT for each link is indicated by the number next to each link. In this example, each MTT is provided in a generic time unit which, for instance, can represents seconds, minutes, or any other quantity of time. In this example, the smallest maneuver MTT is 2 time units corresponding to maneuver (A,B,D) which spans links (A,B) and (B,D). As described above, the MTT for a maneuver is calculated as the sum of the MTTs of its constituent links (e.g., MTT of link (A,B) is 1, and MTT of link (B,D) is 1) to result in an MTT of 2 time units. According to the first approach, the system 200 would set the sampling interval to less than 2 time units.

However, under the second approach, the system 200 would set a different sampling interval. To initiate a calculation of the sampling interval under the second approach, the system 200 calculates determinant MTTs (DMTTs) for each ordered pair of nodes as shown in Table 1 below:

TABLE 1

| NODES | A | B | C | D |
|---|---|---|---|---|
| A | N/A | 20 | N/A | 20 |
| B | N/A | N/A | N/A | N/A |
| C | N/A | N/A | N/A | 11 |
| D | N/A | N/A | N/A | N/A |

The horizontal and vertical axes of Table 1 represent each node A through D, with corresponding DMTTs for each node pair provided in the corresponding cells of the table. Where the DMTTs is undefined (e.g., because there is no path or only one path, and therefore a second shortest path is not available), a value of "N/A" is indicated. Alternatively, undefined DMTTs can be assigned as an infinite value, so that undefined values are not likely to be the resulting minimal value from which a sampling interval is determined. To calculate a DMTT, the system 200 determines the second short path (if available) between each ordered pair of nodes (as noted above, the nodes need not be adjacent). For example, for node pair (A,B), the shortest path is link (A,B), and the second shortest path is through links (A,C) and (C,D). Because the MTT for each link (A,C) and (C,D) is 20, the DMTT for node pair (A,B) is 20 time units. As another example, for node pair (A,C), the DMTT is undefined because there is only one path (e.g., link (A,C)). The system 200 performs the DMTT calculation for each possible combination of node pairs in the graph 190 to construct Table 1. Based on this, the system 200 finds that the minimal DMTT is for node pair (C,D) with a DMTT of 11 time units (e.g., where the second shortest path is through link (C,B) with MTT=10, and link (B,D) with MTT of 1). As a result, under the second approach, the system 200 would set the adaptive sampling interval to less than 11 time units. Clearly, in this case, the second approach provides a more relaxed sampling interval compared to the first approach (e.g., which resulted in a sampling interval of less than 2 time units) while maintaining path reconstructability. However, because the second approach involves calculating DMTTs for each possible ordered pair of nodes in a graph, the computations can be more resource intensive, particularly which the graph is larger. Accordingly, if computation resources or computation speed is a concern, the system 200 can be configured to perform the first approach. If relaxed sampling intervals (e.g., and therefore less data) is favored over conserving computation resource usage, then the system 200 can be configured to perform the second approach. The calculated sampling interval can be used to configure a device to collect probe or location trace data as it travels in a transportation network.

Figure 3:
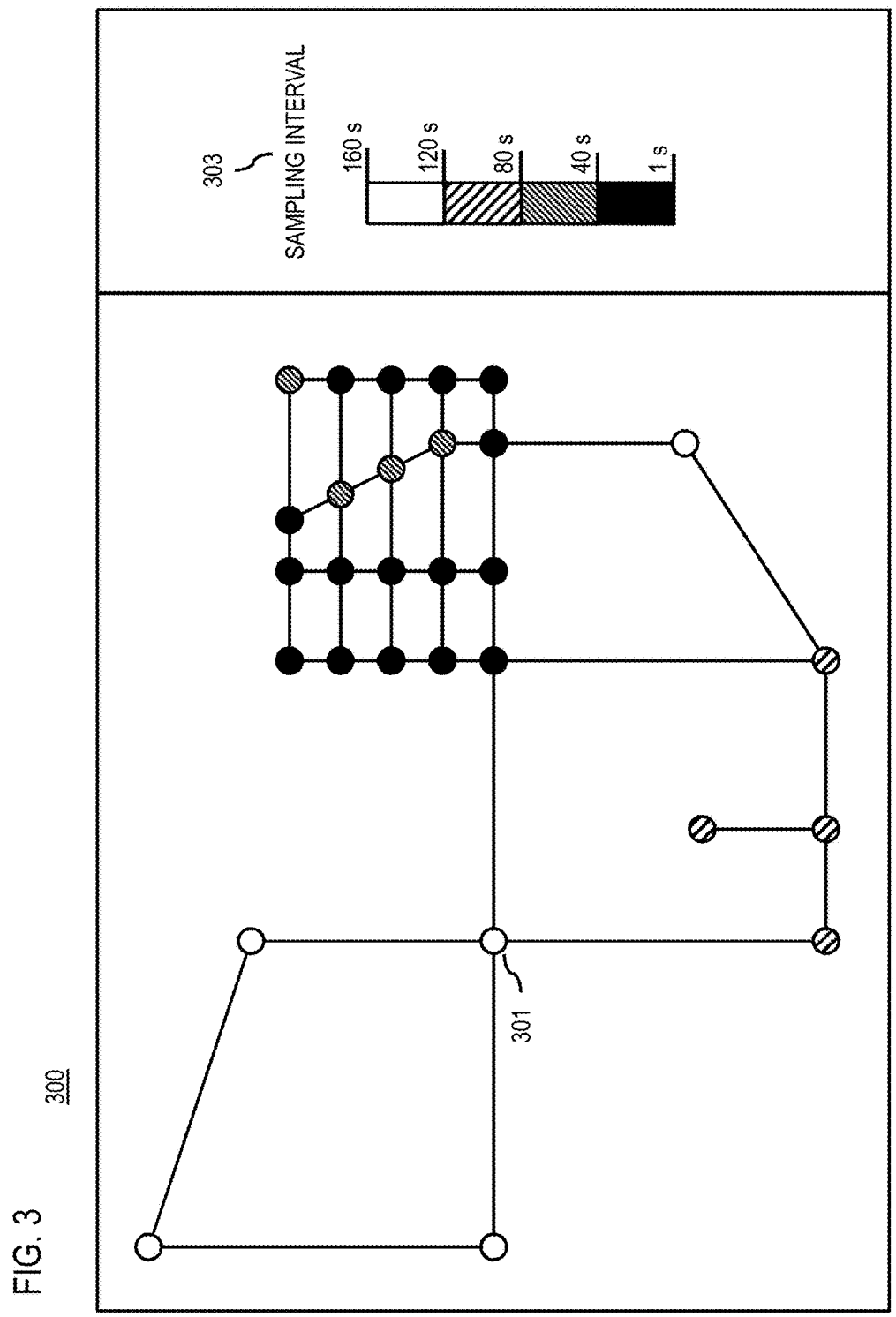
FIG. 3 is a diagram of a sampling map representing adaptive sampling intervals calculated for a localized area of a transportation network, according to one embodiment.

In one embodiment, the system 200 can construct a sampling map 300 as shown in FIG. 3 of the calculated sampling intervals for different nodes and links within a transportation network. In this example, each node (e.g., represented as a circle) of the sampling map 300 is shaded to indicate a sampling interval calculated using approaches of the various embodiments described herein. In one embodiment, for each node (e.g., an intersection node 301), the system 200 takes the node 301 and its neighboring nodes to form a mini graph of a localized area of the transportation network. In one embodiment, the number and/or extent of the neighboring nodes (e.g., direct neighbors only, neighbors of neighbors up to a predetermined degree of separation, etc.) is configurable by the system 200. The system 200 then computes an adaptive sampling period by applying any of the embodiments of approaches described herein to this mini graph. As shown in FIG. 3, the sampling interval typically varies based on map density. As indicated in the sampling interval legend 303, nodes with lighter shading indicate longer sampling intervals and nodes with darker shading indicate shorter sampling intervals (e.g., varying from 1 s to 160 s sampling intervals).

In one embodiment, devices can query the sampling map 300 to determine appropriate sampling intervals for the areas in which the devices are traveling. In addition, the system 200 can generate a user interface to present a visual representation of the sampling map 300. This visual representation can include the elements depicted in FIG. 3.

As shown in FIG. 2, the system 200 comprises a mapping platform 205 with connectivity to the geographic database 207 over a communication network 209. In one embodiment, the mapping platform 205 performs the processes for providing adaptive location sampling for devices (e.g., UE 201 and/or vehicle 203). The UE 201 and/or vehicles 203 act as probes traveling over a road network represented in the geographic database 207 as nodes and links. Although the vehicle 203 is depicted as an automobile, it is contemplated that the vehicle 203 can be any type of transportation vehicle manned or unmanned (e.g., planes, aerial drone vehicles, motor cycles, boats, bicycles, etc.), and the UE 201 can be a mobile or embedded associated with any of the types of vehicles or a person or thing traveling through the transportation network of the geographic database 207. In one embodiment, the UE 201 and/or vehicle 203 are assigned unique probe identifiers (probe IDs) for use in reporting or transmitting collected probe or location trace data to the mapping platform 205 and/or other components of the system 200. In one embodiment, the UE 201 and/or vehicle 203 are part of a probe-based system for collecting probe data for monitoring traffic conditions in a transportation network. In other embodiments, the UE 201 and/or vehicle 203 are end user devices that are clients or consumers of navigation and/or mapping related services.

In one embodiment, the UE 201 and/or vehicle 203 are configured to report probe data as probe points or location points, which are individual data records that record location and/or telemetry data collected at a point in time. In one embodiment, a probe point can include attributes such as a location (e.g., provided a geospatial coordinates such as latitude and longitude), a heading, a speed, a time, or a combination thereof of each of the plurality of devices. The list of attributes is provided by way of illustration and not limitation. It is contemplated that any combination of these attributes or other attributes may be recorded as a probe point. In one embodiment, the UE 201 and/or vehicle 203 may include sensors for reporting measurements and/or reporting attributes. The attributes can also be any attribute normally collected by an on-board diagnostic (OBD) system of the vehicle, and available through an interface to the OBD system (e.g., OBD II interface or other similar interface). These attributes can be activation of backup sensors, steering angle, activation of brakes, etc. that can potentially be indicative of parking-related behavior. In one embodiment, the UE 201 and/or vehicle 203 may be configured with one or more sensors for collecting the probe or location trace data at the adaptive sampling intervals generated by the various embodiments described herein. By way of example, the sensors may include location sensors (e.g., GPS), accelerometers, compass sensors, gyroscopes, altimeters, etc.

In one embodiment, configuring the sensors of the UE 201 with the adaptive sampling rate includes operating the sensors in a continuously active mode of operation (e.g., the GPS sensor remains "on" or in an active state ready to make a location measurement), and then initiating a location point or other sensor measurement at a time indicated by the adaptive sampling interval. It is contemplated that in one mode of operation, the sensor is not switched to an "off" mode between location measurements taken according to the sampling interval. By keeping the sensor active, the system 200 advantageously enables measurements to be made without having to go through any potential sensor start up routines and/or initialization that can potential delay or reduce the accuracy of a ready. For example, a GPS sensor would need to reacquire satellite fixes when powering up from an off or inactive state, which can potentially takes minutes or longer. In addition, it is contemplated that the sampling frequency is a non-zero number. In other words, the sampling interval is set so that at least one sample is scheduled within a predetermined maximum threshold.

In one embodiment, the probe or location data can be collected by the system 200 from the UE 201 and/or vehicle 203 in real-time, in batches, continuously, or at any other frequency requested by the system 200 over, for instance, the communication network 209 for storage and/or processing by the mapping platform 205. The probe or location points also can be mapped to specific road links stored in the geographic database 207. In one embodiment, the system 200 (e.g., via the mapping platform 205) can generate probe traces from the probe points for an individual probe so that the probe traces represent a travel path of the probe through the road network. As previously discussed, the mapping platform 205 can adaptive specify the sampling interval for the UE 201 and/or the vehicle 203 to collect the probe or location points to guarantee path reconstructability.

In one embodiment, when a UE 201 and/or vehicle 213 requests navigation or mapping related services, the travel path of the device reconstructed from the collected probe or location data can be used as at least on input for providing the requested services. In one embodiment, these services can be provided by a service platform 211, one or more services 213a-213m (also collectively referred to as services 213), one or more content providers 215a-215k (also collectively referred to as content providers 215), or a combination thereof. In one embodiment, the UE 201 and/or vehicle 203 may execute a client application 217 to access the services or functions of the service platform 211, the services 213, and/or the content providers 215.

By way of example, the UE 201 may be any mobile computer including, but not limited to, an in-vehicle navigation system, vehicle telemetry device or sensor, a personal navigation device ("PND"), a portable navigation device, a cellular telephone, a mobile phone, a personal digital assistant ("PDA"), a wearable device, a camera, a computer and/or other device that can perform navigation or location based functions, i.e., digital routing and map display. In some embodiments, it is contemplated that mobile computer can refer to a combination of devices such as a cellular telephone that is interfaced with an on-board navigation system of an autonomous vehicle or physically connected to the vehicle for serving as the navigation system.

As described, the UE 201 and/or vehicle 203 may be configured with applications 217 for interacting with the mapping platform 205, geographic database 207, service platform 211, services 213, content providers 215, or a combination thereof. Through these services, the applications 217 may acquire navigation information, location information, mapping information, other data associated with the current location of the UE 201 and/or vehicle 213, a direction or movement of the vehicle along a roadway, etc.

As discussed above, the UE 201 and/or vehicle 203 may be configured with various sensors for acquiring and/or generating probe or location data at adaptive sampling rates. For example, the sensors may be used as GPS receivers for interacting with one or more satellites 219 to determine and track the current speed, position and location of a vehicle travelling along a roadway. In addition, the sensors may gather tilt data (e.g., a degree of incline or decline of the vehicle during travel), motion data, light data, sound data, image data, weather data, temporal data and other data associated with the UE 201 and/or vehicle 203. Still further, the sensors may detect local or transient network and/or wireless signals, such as those transmitted by nearby devices during navigation along a roadway. This may include, for example, network routers configured within a premise (e.g., home or business), another UE 201 or vehicle 203, or a communicable traffic system (e.g., traffic lights, traffic cameras, traffic signals, digital signage).

By way of example, the mapping platform 205 may be implemented as a cloud based service, hosted solution or the like for performing the above described functions. Alternatively, the mapping platform 205 may be directly integrated for processing data generated and/or provided by the service platform 211, services 213, content providers 215, and/or applications 217. Per this integration, the mapping platform 205 may perform client-side adaptive location sampling as described with respect to the various embodiments described herein.

By way of example, the communication network 209 of system 200 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

By way of example, the mapping platform 205 communicates with other components of the system 200 using well known, new or still developing protocols. In this context, a protocol includes a set of rules defining how the network nodes within the communication network 209 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 4:
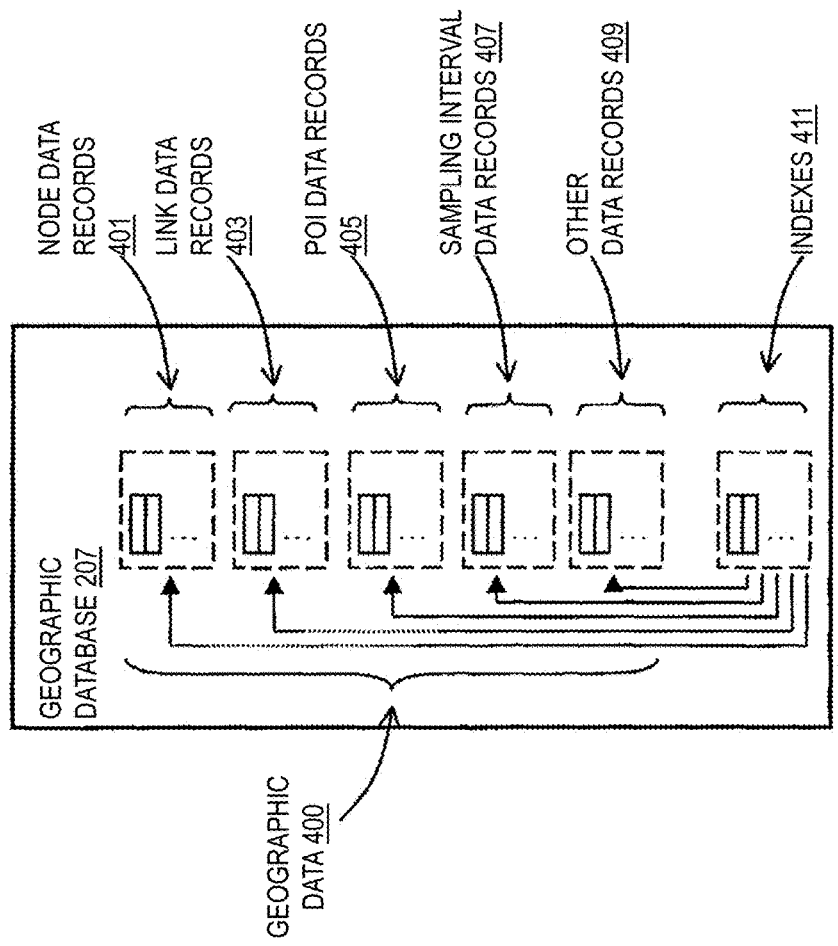
FIG. 4 is a diagram of a geographic database, according to one embodiment.

FIG. 4 is a diagram of the geographic database 207, according to one embodiment. In one embodiment, adaptive sampling intervals and/or any other information used or generated by the system 200 to calculate the sampling intervals can be stored, associated with, and/or linked to the geographic database 207 or data thereof. In one embodiment, the geographic or map database 207 includes geographic data 400 used for (or configured to be compiled to be used for) mapping and/or navigation-related services, such as for route information, service information, estimated time of arrival information, location sharing information, speed sharing information, and/or geospatial information sharing, according to exemplary embodiments. For example, the geographic database 207 includes node data records 401, road segment or link data records 403, POI data records 405, sampling interval data records 407, other data records 409, and/or indexes 411 for example. More, fewer or different data records can be provided.

In one embodiment, the indexes 411 may improve the speed of data retrieval operations in the geographic database 207. In one embodiment, the indexes 411 may be used to quickly locate data without having to search every row in the geographic database 207 every time it is accessed. In one embodiment, the other data records 409 include cartographic ("carto") data records, routing data, and maneuver data. As noted above, the maneuver data identify potential maneuvers within a network comprised of two or more adjacent road links. In other words, a maneuver indicate possible turns or other actions a device traveling a transportation network can take. In one embodiment, maneuvers are defined at intersections nodes where different turns or actions can be taken. Each maneuver would then comprise the links making up each possibility (e.g., links indicating a left turn at the intersection node, a right turn at an intersection node, continuing straight at an intersection node, etc.).

In one embodiment, one or more portions, components, areas, layers, features, text, and/or symbols of the POI or event data can be stored in, linked to, and/or associated with the geographic data 400 using the POI data records 405. For example, one or more portions of a POI and/or characteristics of the POI (e.g., descriptive metadata, related event data, etc.) can be matched with respective map or geographic records via position or GPS data associations (such as using known or future map matching or geo-coding techniques), for example. In one embodiment, the POI data records 147 may also include information on locations of traffic controls (e.g., stoplights, stop signs, crossings, etc.).

In exemplary embodiments, the road segment or link data records 403 are links or segments representing roads, streets, or paths, as can be used in the calculated route or recorded route information. The link data records 403 can include road density information that represent at least a physical length of a link. In some embodiments, the length or road density of link can be measured directly from the road way or may be calculated as the distance between the starting and ending nodes of the link. In one embodiment, the one or more adjacent links can be combined into a super link as discussed in the various embodiments described herein. In this case, the link data records 403 can also store information on super links that have been created, and information on the regular links included the corresponding supper link. The link data records can also indicate a direction of travel along the link to facilitate determining available paths through a road network. In one embodiment, the node data records 401 are end points corresponding to the respective links or segments of the road segment data records 403.

The road link data records 403 and the node data records 401 represent a road network, such as used by vehicles, cars, and/or other entities. In other words, the nodes and links of the data records 401 and 403 comprise a system for representing the geospatial characteristics of a transportation the nodes represent various location points (e.g., latitude and longitude) of the network and the links represent an extent of a road or path between the nodes. Generally, the nodes are located at intersections points of the road network to minimize the number of nodes needed to represent a transportation network. However, in some embodiments, a node can also fall at a non-intersection point. In which, the node at the non-intersection can be a shape node which can be used to indicate or more closely follow a road or path with a more complex shape. Alternatively, the geographic database 207 can contain path segment and node data records or other data that represent pedestrian paths or areas in addition to or instead of the vehicle road record data, for example.

The road link and nodes can be associated with attributes, such as a functional class, a road density or link length, a speed attribute (e.g., speed limit along a link, a free-flow speed of traffic along a link, and/or any other indication of an expected speed of travel along the link), parking availability information, geographic coordinates, street names, address ranges, turn restrictions at intersections, and other navigation related attributes, as well as POIs, such as traffic controls (e.g., stoplights, stop signs, crossings, etc.), gasoline stations, hotels, restaurants, museums, stadiums, offices, automobile dealerships, auto repair shops, buildings, stores, parks, etc. As indicated above, the geographic database 400 can include data about the POIs and their respective locations in the POI data records 405. The geographic database 400 can also include data about places, such as cities, towns, or other communities, and other geographic features, such as bodies of water, mountain ranges, etc. Such place or feature data can be part of the POI data or can be associated with POIs or POI data records 405 (such as a data point used for displaying or representing a position of a city).

In one embodiment, the geographic data 400 also includes sampling interval data records 407 that store the adaptive sampling interval for collecting probe or location trace data as to ensure path reconstructability as discussed with respect to the various embodiments described herein. In one embodiment, the sampling interval is expressed as an amount of time between each location sample. In addition or alternatively, the sampling interval can be stored or calculated as a sampling frequency (e.g., number of samples to take per unit of time) or any other equivalent expression of how often location samples must be taken in a localized area of a transportation network to guarantee path reconstructability while minimizing the number of potentially unnecessary samples that are to be collected, stored, and/or processed. In one embodiment, the sampling interval data records 407 can be associated with the node (e.g., intersection node) and/or link data records 401 and 405 of the geographic database 400.

In one embodiment, the geographic database 400 can be maintained by the content provider 215 in association with the service platform 211 (e.g., a map developer). The map developer can collect geographic data to generate adaptive location sampling intervals and enhance the geographic database 207. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database 400 can be a master geographic database stored in a format that facilitates updating, maintenance, and development. For example, the master geographic database 400 or data in the master geographic database 400 can be in an Oracle spatial format or other spatial format, such as for development or production purposes. The Oracle spatial format or development/production database can be compiled into a delivery format, such as a geographic data files (GDF) format. The data or publication thereof may be partitioned into channels configured for incremental updates. The data in the production and/or delivery formats can be compiled or further compiled to form geographic database products or databases, which can be used in end user navigation devices or systems.

For example, geographic data or geospatial information is compiled (such as into a platform specification format (PSF) format) to organize and/or configure the data for performing map or navigation-related functions and/or services, such as map annotation, route calculation, route guidance, map display, speed calculation, distance and travel time functions, and other functions, by a navigation device, such as by a UE 201 and/or vehicle 203, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

As mentioned above, the geographic database 400 can be a master geographic database, but in alternate embodiments, the geographic database 400 can represent a compiled navigation database that can be used in or with end user devices (e.g., UE 201, vehicle 203, etc.) to provide navigation- or mapping-related functions. For example, the geographic database 400 can be used with the end user device 201 and/or 203 to configure the device for adaptive location sampling based on the road density and speed attribute of the road links along which the devices are traveling. In such a case, the geographic database 400 can be downloaded or stored on the end user device (e.g., UE 201, vehicle 203, etc.), such as in applications 217, or the end user device 201 or 203 can access the geographic database 400 through a wireless or wired connection (such as via a server and/or the communication network 209), for example.

Figure 5:
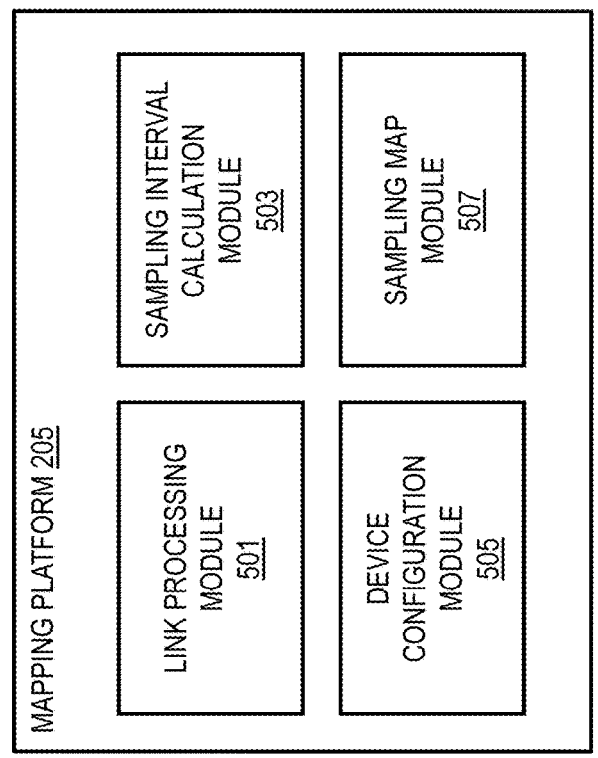
FIG. 5 is a diagram of the components of a mapping platform, according to one embodiment.

FIG. 5 is a diagram of the components of a mapping platform 205, according to one embodiment. By way of example, the mapping platform 205 includes one or more components for providing adaptive location sampling in mobile devices. It is contemplated that the functions of these components may be combined or performed by other components of equivalent functionality. In this embodiment, the mapping platform 205 includes a link processing module 501, a sampling interval calculation module 503, a device configuration module 505, and a sampling map module 507. The above presented modules and components of the mapping platform 205 can be implemented in hardware, firmware, software, or a combination thereof. Though depicted as a separate entity in FIG. 2, it is contemplated that the mapping platform 205 may be implemented as a module of any of the components of the system 200. In another embodiment, one or more of the modules 501-507 may be implemented as a cloud based service, local service, native application, or combination thereof. The functions of these modules are discussed with respect to FIGS. 6-9 below.

Figure 6:
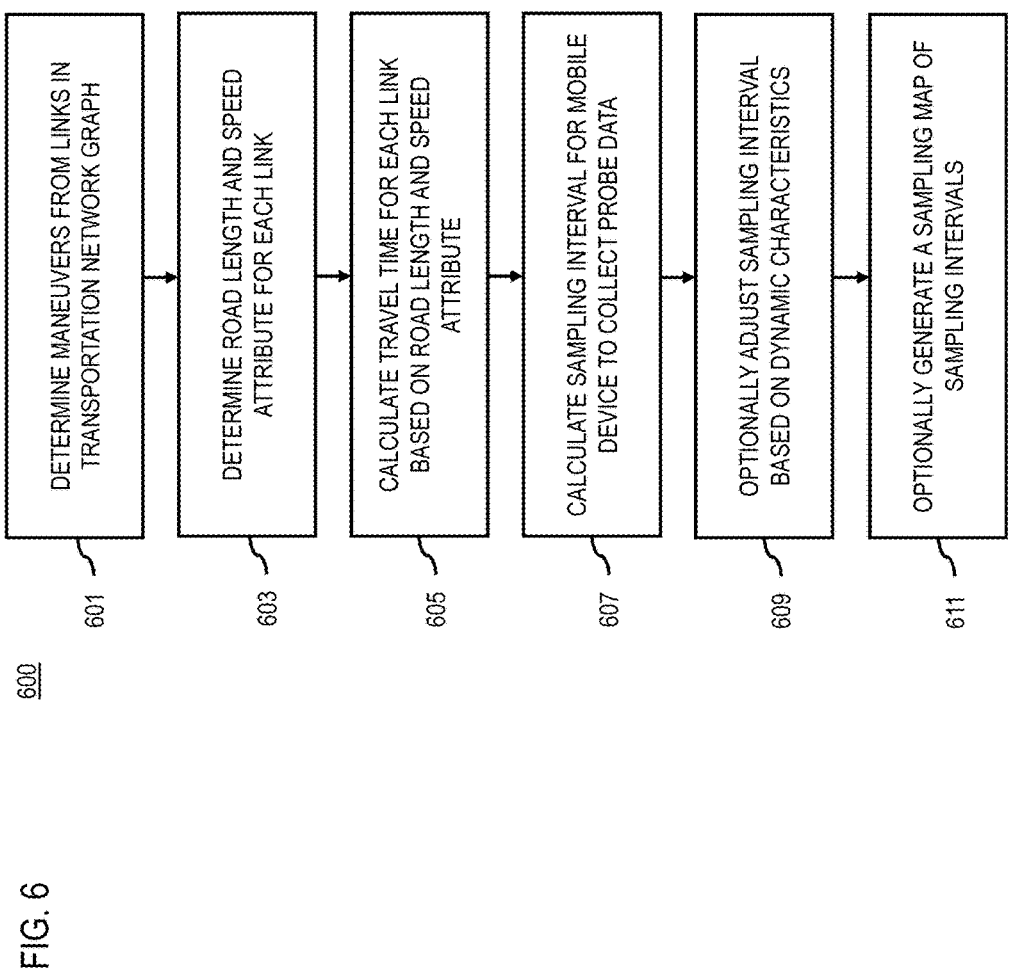
FIG. 6 is a flowchart of a process for providing adaptive location sampling in a mobile device based on travel times of maneuvers, according to one embodiment.
Figure 11:
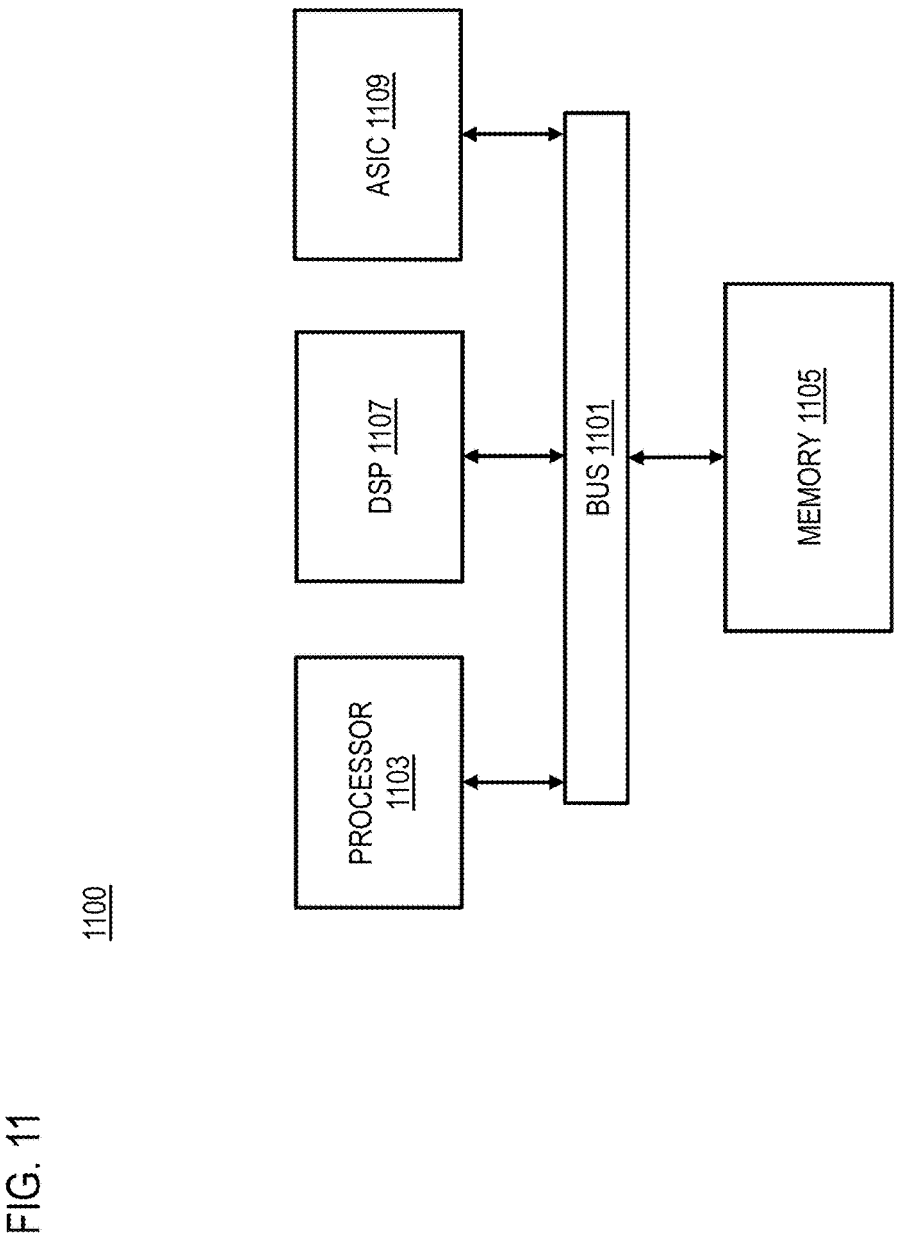
FIG. 11 is a diagram of a chip set that can be used to implement an embodiment of the invention.

FIG. 6 is a flowchart of a process for providing adaptive location sampling in a mobile device based on travel times of maneuvers, according to one embodiment. In various embodiments, the mapping platform 205 and/or the modules 501-507 of the mapping platform 205 as shown in FIG. 5 may perform one or more portions of the process 600 and may be implemented in, for instance, a chip set including a processor and a memory as shown in FIG. 11. As such, the mapping platform 205 and/or the module 501-507 can provide means for accomplishing various parts of the process 600, as well as means for accomplishing embodiments of other processes described herein in conjunction with other components of the system 200. Although the process 600 is illustrated and described as a sequence of steps, its contemplated that various embodiments of the process 600 may be performed in any order or combination and need not include all of the illustrated steps.

In step 601, the link processing module 501 determines one or more maneuvers from among a plurality of one or more links representing a localized area of a transportation network. In one embodiment, each of the one or more maneuvers is a combination of two or more adjacent links of the one or more links. The links, for instance, are part of a graph of nodes and links that depict the transportation network within the localized area. By way example, the localized area of the transportation network refers to any subset or part of the entire transportation network. The size of the localized area can vary from a single node or link to an entirety of all nodes and links stored in the geographic database 207. In one embodiment, the link processing module 501 determines a mini graph comprising an intersection node and its neighboring nodes to begin determining sampling intervals. Multiple mini graphs can be defined to provide complete coverage of the localized area of interest with sampling intervals calculated separately for each mini graph.

In one embodiment, a maneuver is defined with at least a triple of nodes based on a starting node, at least one intermediate node, and an ending node. Within each maneuver, there is a first link between the starting node and the at least one intermediate node, and a second link between at least one intermediate node and the ending node. In other words, a maneuver comprises a sequence of at least two adjacent links that represent a possible turn or navigation action that can be taken by a device (e.g., the UE 201 and/or vehicle 203) while traveling in the localized area.

In step 603, the link processing module 501 determines a road length and a speed attribute for each link in said each maneuver. In one embodiment, the lengths of individual links or road segments is indicative of the geospatial or road density of a given area. For example, an area containing a higher number of links with shorter road lengths typically represent has a higher density of roads because shorter lengths typically mean there also are more intersections or converging roads. Generally, it is in these areas of higher road densities where sampling intervals set to be smaller to ensure path reconstructability. In one embodiment, these attributes (e.g., road lengths and speed attributes) can be queried from the geographic database 207 and/or from any other equivalent data source.

In step 605, the sampling interval calculation module 503 calculates a travel time for each maneuver based on the road lengths and the speed attribute of said each link. As discussed previously, the travel time can be an MTT calculated, for instance, as road length divided by speed attribute. The MTT can be calculated for each link in the maneuver and then added together to determine the MTT for the maneuver.

In step 607, the sampling interval calculation module 503 calculates a sampling interval for the mobile device traveling in the localized area based on the travel time. In one embodiment, the sampling interval is calculated to be smaller than the travel time for a minimal of the travel times calculated for the maneuvers and/or links in the graph. By way of example, a travel path of the mobile device within the localized area is reconstructable from the probe data collected using this sampling interval.

In one embodiment, a mobile device is then configured to collect probe data using one or more sensors at the sampling interval while traveling in the localized area.

In step 609, the sampling interval calculation module 503 optionally adjusts the sampling interval based on one or more dynamic characteristics of said each link, the localized area, the transportation network, or a combination thereof. By way of example, the dynamic characteristics can include traffic, weather, reported incidents (e.g., traffic, construction, etc.), and/or any other factor that can affect the speed of travel along a route. The dynamic characteristics can be reported or queried from one or more services or sensed by the devices traveling in the transportation network. In one embodiment, the mobile device is then configured to collect the probe data using the adjusted sampling interval.

In step 611, the sampling map module 507 generates a sampling map of the sampling interval(s) for the localized area. In one embodiment, the sampling map is a geospatial representation of the sampling interval for each link or node in a graph of an area of interest (e.g., see FIG. 3 above). In one embodiment, the mobile device queries the sampling map to determine the sampling interval when the mobile device travels in the localized area.

Figure 7:
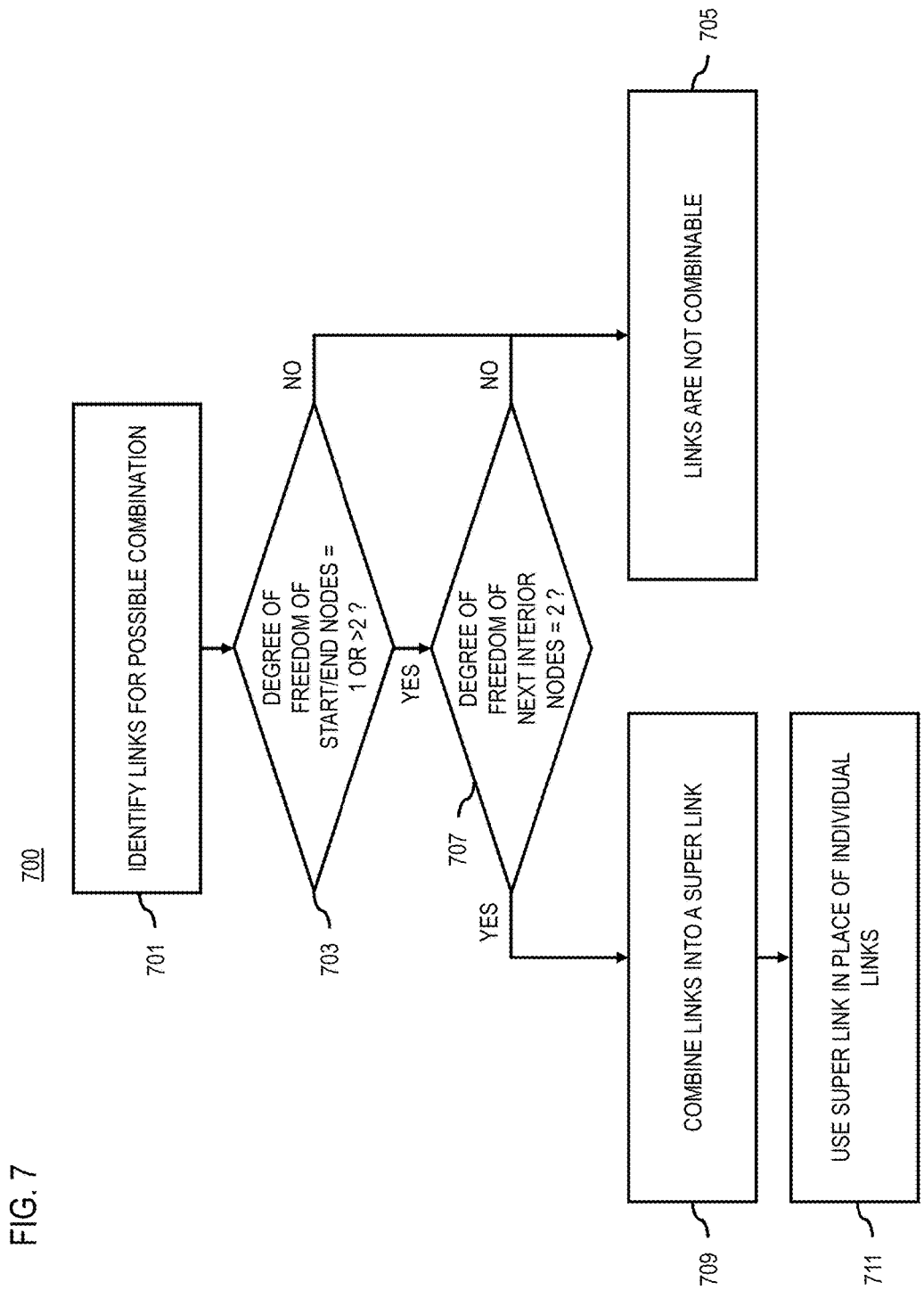
FIG. 7 is a flowchart of a process for combining a link chain into a super link for adaptive location sampling, according to one embodiment.

FIG. 7 is a flowchart of a process for combining a link chain into a super link for adaptive location sampling, according to one embodiment. In various embodiments, the mapping platform 205 and/or the modules 501-507 of the mapping platform 205 as shown in FIG. 5 may perform one or more portions of the process 700 and may be implemented in, for instance, a chip set including a processor and a memory as shown in FIG. 11. As such, the mapping platform 205 and/or the module 501-507 can provide means for accomplishing various parts of the process 700, as well as means for accomplishing embodiments of other processes described herein in conjunction with other components of the system 200. Although the process 700 is illustrated and described as a sequence of steps, its contemplated that various embodiments of the process 700 may be performed in any order or combination and need not include all of the illustrated steps.

In one embodiment, the process 700 is optionally performed in conjunction with the process 600 of FIG. 6 when at least some of the plurality of one or more links forms a link chain. A link chain, for instance, is a sequence of two or more adjacent links in the graph. In some cases, the links in the link chain can be combined when, for instance, there geometries will not affect the sampling interval calculation though the combination. Accordingly, in step 701, the link processing module 501 identifies links in the link chain for possible combination. This identification includes determining whether the links in the link chain meet certain criteria. For example, the link processing module 501 can combine the link chains into a super link by first determining whether a starting node and ending node of the link chain have a degree of freedom that is equal to one or is greater than two (step 703). In one embodiment, the degree of freedom represents a total number of inbound links and outbound links. This condition determines whether the starting and ending nodes are either terminating nodes (degree of freedom=1) or intersection nodes (degree of freedom >2).

If this condition is not met (e.g., the starting and ending nodes are non-intersection nodes), the links in the link chain are not combinable (step 705). If the condition of step 703 is met (e.g., the starting and ending nodes are intersection nodes), the link processing module 501 then determines whether a proceeding node after the starting node and a preceding node before the ending node have a degree of freedom that is equal to two (step 707). In other words, if the starting and ending nodes are intersection nodes, then the immediate interior nodes are analyzed to determine whether they are non-intersection nodes. If this condition is not met (e.g., one or more of the immediate interior nodes are intersection nodes), the links in the link chain also are not combinable (step 705).

If the conditions of both steps 703 and 707 are met (e.g., the starting and ending nodes are intersection nodes, and the immediate interior nodes are non-intersection nodes), the link processing module 501 combines the link chain into a super link (step 709). In one embodiment, the super link effectively removes the intermediate nodes of the link chain while effectively retaining the overall geometry of the link chain, thereby simplifying the multiple links of the link chain into a single super link.

In one embodiment, the sampling interval is further based on the travel time calculated for the super link. The MTT for the super link is the sum of the MTTs for each regular link within the super link. In one embodiment, the super link replaces each link that is included in the super link when calculating the travel time and the sampling interval (step 711). Accordingly, when super links are calculated, the sampling interval is calculated to be smaller than the travel time for a minimal of the travel times calculated for the one or more maneuvers and the super links in the graph.

Figure 8:
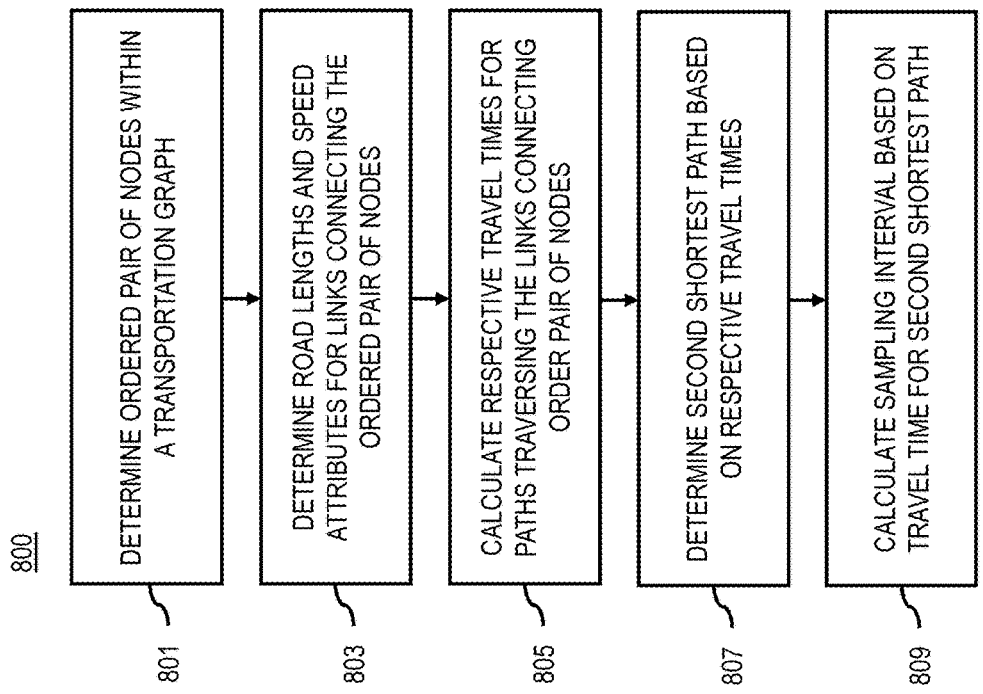
FIG. 8 is a flowchart of a process for providing adaptive location sampling using a determinant travel time, according to one embodiment.

FIG. 8 is a flowchart of a process for providing adaptive location sampling using a determinant travel time, according to one embodiment. In various embodiments, the mapping platform 205 and/or the modules 501-507 of the mapping platform 205 as shown in FIG. 5 may perform one or more portions of the process 800 and may be implemented in, for instance, a chip set including a processor and a memory as shown in FIG. 11. As such, the mapping platform 205 and/or the module 501-507 can provide means for accomplishing various parts of the process 800, as well as means for accomplishing embodiments of other processes described herein in conjunction with other components of the system 200. Although the process 800 is illustrated and described as a sequence of steps, its contemplated that various embodiments of the process 800 may be performed in any order or combination and need not include all of the illustrated steps.

As previously described, the mapping platform 205 can calculate sampling intervals based on a maneuver approach, or based on a determinant MTT (DMTT). Process 800 provides briefly summarizes the description of the determinant MTT approach discussed in more detail above.

In step 801, the link processing module 501 determines an ordered pair of nodes within a graph representing a localized area of a transportation network. In one embodiment, the graph includes at least one intersection node and one or more other nodes neighboring the at least one intersection node within the localized area. An ordered pair can be any combination of nodes within the graph including self combinations of single nodes. In one embodiment, an ordered pair indicates that a pair (A,B) is unique from a pair (B,A). As previously noted, the pair of nodes need not be adjacent nodes.

In step 803, the link processing module 501 determines a second shortest path between the ordered pair of nodes. The graph can be traversed to discover all paths between any two nodes, and the second shortest with respect to a calculated travel time (e.g., MTT) is selected. If there is no path or only one path, the link processing module 501 leaves the pair undefined and moves on to the next ordered pair.

In step 803, the link processing module 501 determines respective road lengths and respective speed attributes for one or more links connecting the ordered pair of nodes. The link processing module 501, for instance, queries or otherwise determines the road links or sequence of links that can provide a path between the first node of the pair and the second node of the pair.

In some cases, there may be a sufficient number of links between the nodes to provide multiple paths between the two nodes in the pair. Accordingly, in step 805, the sampling interval calculation module 503 calculates respective travel times for one or more paths traversing the one or more links based on the determined road lengths and speed attributes. In one embodiment, the calculated travel time is a determinant MTT (DMTT) which is further calculated according to the following conditions and/or rules: (1) If each node in the ordered pair of nodes is the same node, the DMTT for the ordered pair of nodes is calculated based on a shortest path from the same node to itself; (2) the DMTT is not defined when there is no path or only one path between the ordered pair of nodes (e.g., when there is no second shortest path between an ordered pair of nodes). In other words, the sampling interval calculation module 503 determines a second shortest path from among the one or more paths possible between the nodes. The second shortest path, for instance, is the path that is associated with the second shortest travel time (e.g., MTT) between the ordered pair of nodes (step 807).

In step 809, the sampling interval calculation module 503 calculates a sampling interval for the mobile device traveling in the localized area based on the travel time or DMTT (e.g., the second shortest travel time corresponding to the second shortest path). In one embodiment, in order to calculate the sampling interval, the sampling interval calculation module 503 calculates respective travel times or DMTTs for respective second shortest paths for all ordered pairs of nodes in the graph (see Table 1 above). The sampling interval is then calculated to be smaller than a minimal of the respective travel times or DMTTs for all the ordered pairs of nodes in the graph. In one embodiment, the mobile device is configured to collect probe data using one or more sensors at the sampling interval while traveling in the localized area.

In one embodiment, the sampling map module 507 stores the sampling interval in the geographic database 207 as attribute of the ordered pair of nodes, each link, the localized area, the transportation network, or a combination thereof.

Figure 9:
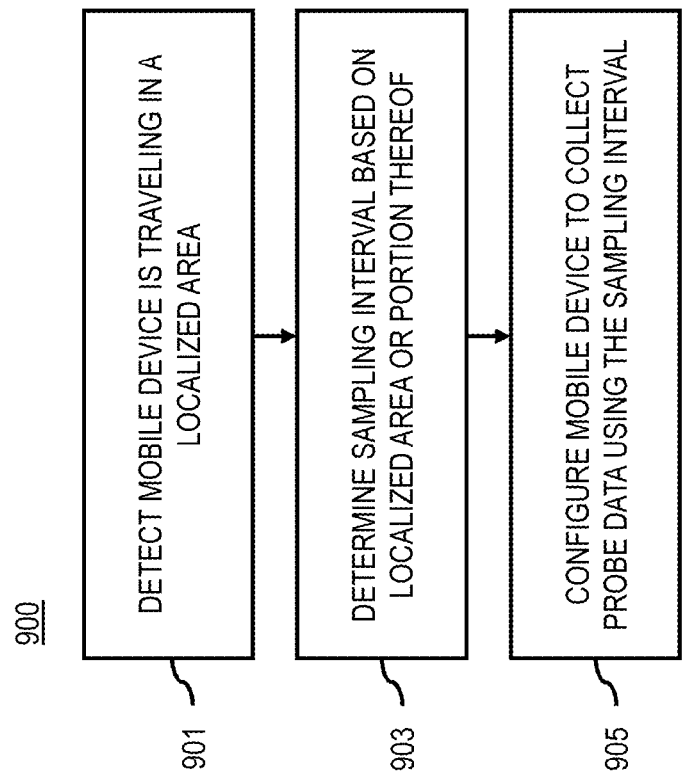
FIG. 9 is a flowchart of a process configuring a mobile device for adaptive location sampling, according to one embodiment.

FIG. 9 is a flowchart of a process configuring a mobile device for adaptive location sampling, according to one embodiment. In various embodiments, the mapping platform 205 and/or the modules 501-507 of the mapping platform 205 as shown in FIG. 5 may perform one or more portions of the process 900 and may be implemented in, for instance, a chip set including a processor and a memory as shown in FIG. 11. As such, the mapping platform 205 and/or the module 501-507 can provide means for accomplishing various parts of the process 900, as well as means for accomplishing embodiments of other processes described herein in conjunction with other components of the system 200. Although the process 900 is illustrated and described as a sequence of steps, its contemplated that various embodiments of the process 900 may be performed in any order or combination and need not include all of the illustrated steps.

In step 901, the device configuration module 505 detects that a mobile device is traveling in a localized area of a transportation network. For example, a sensed location of the device can be analyzed to determine whether the device has entered or is traveling in a particular area of the transportation network.

In step 903, the device configuration module 507 determines a sampling interval based on the localized area in which the mobile device is detected (e.g., the sensed location of the device). In other words, depending on where the device is located in a transportation network, the device can be configured with a different sampling rate. As previously discussed, varying the sampling rate with a road density at a given location or area of transportation network can advantageously provide sufficient data for path reconstructability while minimizing the amount of location data that is collected, stored, and/or processed to reconstruct a path. In this way, the adaptive sampling interval can be smaller for more dense areas of the transportation network and larger for less dense areas.

In one embodiment, the device configuration module 505 queries the geographic database 207 for a sampling interval for the localized area. In addition or alternatively, the device configuration module 505 can locally calculate the sampling interval at the device (e.g., without intervention of a network server or component). In one embodiment, the sampling interval is calculated as an adaptive sampling interval based on a travel time determined from a road length and a speed attribute of each link within the localized area. As previously described, the sampling interval can be calculated using one of two approaches: (1) based on the minimal of the MTTs for all maneuvers and super links in a graph; and (2) based on the minimal of determinant MTTs for all ordered pairs of nodes in a graph.

In step 905, the device configuration module 507 configures the mobile device to collect probe data using the sampling interval while traveling in the localized area. In other words, the devices location and/or other sensors are configured so that they collect probe or location points only at the sampling interval.

In one embodiment, the sampling interval calculation module 503 determines dynamic attributes or characteristics (e.g., traffic, weather incidents, etc.) of the localized area of the transportation network. These dynamic attributes or characteristics are selected as those that are likely to affect the travel speed of a device traveling the link. The sampling interval calculation module 503 than adjusts the sampling interval based on the dynamic attributes. For example, the effect of the dynamic attributes on the speed attribute of the link can be calculated to determine an adjusted speed attribute for the device (e.g., speed reduced by 50% by heavy traffic). This adjusted speed attributed can then be used to calculate an adjusted MTT or travel time through the link to ultimately adjust the sampling interval.

In one embodiment, the device configuration module 505 can also adjust the sampling interval based on a topology of the localized area or the transportation network. Even when there is no dynamic factor affecting the sampling interval, the sampling interval calculation module 503 can determine whether a location point that is scheduled to be taken based on a configured sampling interval will fall at an inconvenient point of a map topology. For example, when a scheduled sampling point is expected to fall at the beginning a particularly complex intersection, the device configuration module 505 may configure the device to sense the location point earlier or later than schedule to improve path reconstruction. The device configuration module 507 then configures the mobile device to collect the probe data using the adjusted sampling interval.

The processes described herein for providing adaptive location sampling in mobile devices may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 10:
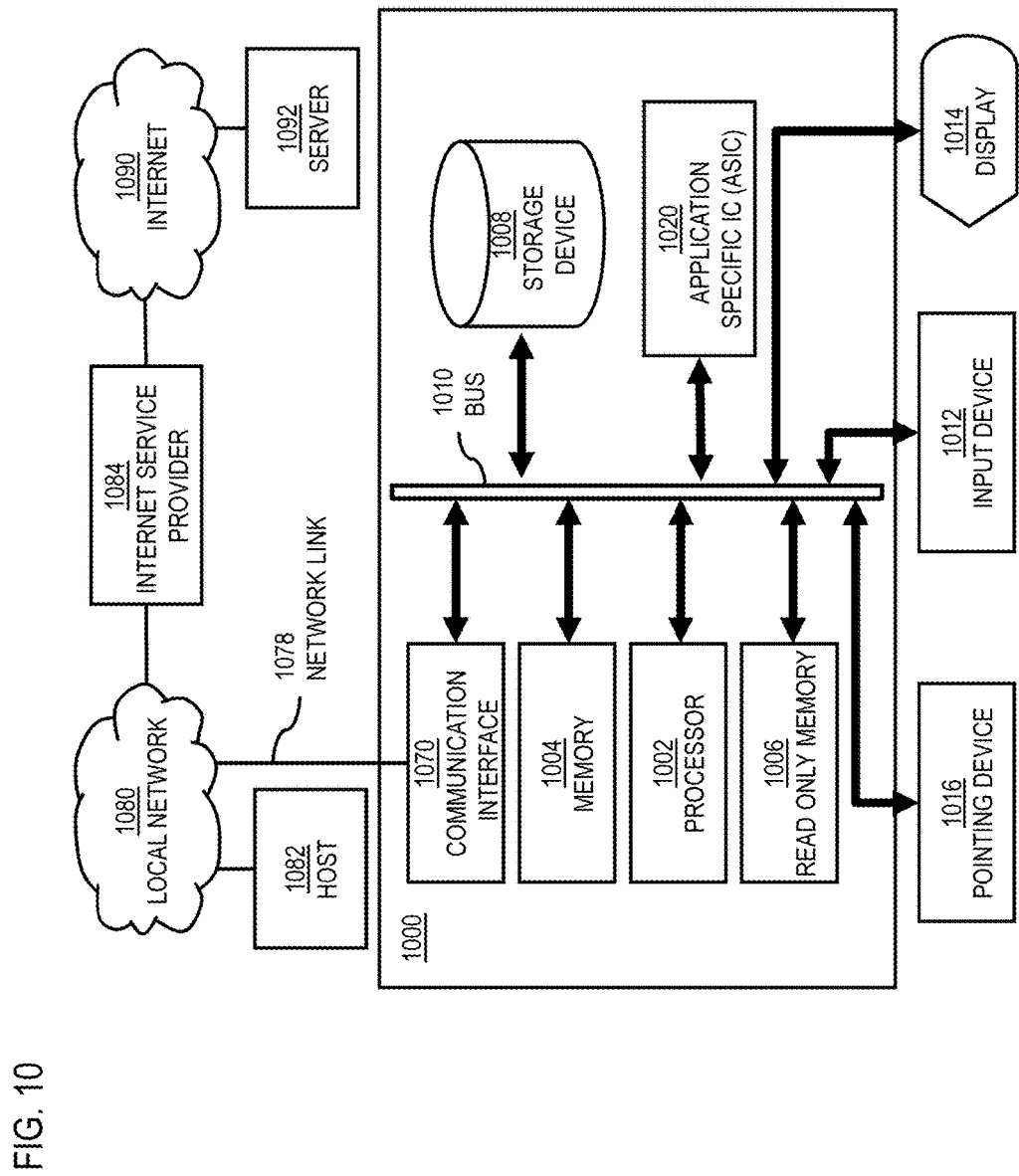
FIG. 10 is a diagram of hardware that can be used to implement an embodiment of the invention.

FIG. 10 illustrates a computer system 1000 upon which an embodiment of the invention may be implemented. Computer system 1000 is programmed (e.g., via computer program code or instructions) to provide adaptive location sampling in mobile devices as described herein and includes a communication mechanism such as a bus 1010 for passing information between other internal and external components of the computer system 1000. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1010 includes one or more parallel conductors of information so that information is transferred quickly among devices coupled to the bus 1010. One or more processors 1002 for processing information are coupled with the bus 1010.

A processor 1002 performs a set of operations on information as specified by computer program code related to providing adaptive location sampling in mobile devices. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1010 and placing information on the bus 1010. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1002, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1000 also includes a memory 1004 coupled to bus 1010. The memory 1004, such as a random access memory (RAM) or other dynamic storage device, stores information including processor instructions for providing adaptive location sampling in mobile devices. Dynamic memory allows information stored therein to be changed by the computer system 1000. RAM allows a unit of information stored at a location called a memory address to be stored and retrieved independently of information at neighboring addresses. The memory 1004 is also used by the processor 1002 to store temporary values during execution of processor instructions. The computer system 1000 also includes a read only memory (ROM) 1006 or other static storage device coupled to the bus 1010 for storing static information, including instructions, that is not changed by the computer system 1000. Some memory is composed of volatile storage that loses the information stored thereon when power is lost. Also coupled to bus 1010 is a non-volatile (persistent) storage device 1008, such as a magnetic disk, optical disk or flash card, for storing information, including instructions, that persists even when the computer system 1000 is turned off or otherwise loses power.

Information, including instructions for providing adaptive location sampling in mobile devices, is provided to the bus 1010 for use by the processor from an external input device 1012, such as a keyboard containing alphanumeric keys operated by a human user, or a sensor. A sensor detects conditions in its vicinity and transforms those detections into physical expression compatible with the measurable phenomenon used to represent information in computer system 1000. Other external devices coupled to bus 1010, used primarily for interacting with humans, include a display device 1014, such as a cathode ray tube (CRT) or a liquid crystal display (LCD), or plasma screen or printer for presenting text or images, and a pointing device 1016, such as a mouse or a trackball or cursor direction keys, or motion sensor, for controlling a position of a small cursor image presented on the display 1014 and issuing commands associated with graphical elements presented on the display 1014. In some embodiments, for example, in embodiments in which the computer system 1000 performs all functions automatically without human input, one or more of external input device 1012, display device 1014 and pointing device 1016 is omitted.

In the illustrated embodiment, special purpose hardware, such as an application specific integrated circuit (ASIC) 1020, is coupled to bus 1010. The special purpose hardware is configured to perform operations not performed by processor 1002 quickly enough for special purposes. Examples of application specific ICs include graphics accelerator cards for generating images for display 1014, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1000 also includes one or more instances of a communications interface 1070 coupled to bus 1010. Communication interface 1070 provides a one-way or two-way communication coupling to a variety of external devices that operate with their own processors, such as printers, scanners and external disks. In general the coupling is with a network link 1078 that is connected to a local network 1080 to which a variety of external devices with their own processors are connected. For example, communication interface 1070 may be a parallel port or a serial port or a universal serial bus (USB) port on a personal computer. In some embodiments, communications interface 1070 is an integrated services digital network (ISDN) card or a digital subscriber line (DSL) card or a telephone modem that provides an information communication connection to a corresponding type of telephone line. In some embodiments, a communication interface 1070 is a cable modem that converts signals on bus 1010 into signals for a communication connection over a coaxial cable or into optical signals for a communication connection over a fiber optic cable. As another example, communications interface 1070 may be a local area network (LAN) card to provide a data communication connection to a compatible LAN, such as Ethernet. Wireless links may also be implemented. For wireless links, the communications interface 1070 sends or receives or both sends and receives electrical, acoustic or electromagnetic signals, including infrared and optical signals, that carry information streams, such as digital data. For example, in wireless handheld devices, such as mobile telephones like cell phones, the communications interface 1070 includes a radio band electromagnetic transmitter and receiver called a radio transceiver. In certain embodiments, the communications interface 1070 enables connection to the communication network 209 for providing adaptive location sampling in mobile devices.

The term computer-readable medium is used herein to refer to any medium that participates in providing information to processor 1002, including instructions for execution. Such a medium may take many forms, including, but not limited to, non-volatile media, volatile media and transmission media. Non-volatile media include, for example, optical or magnetic disks, such as storage device 1008. Volatile media include, for example, dynamic memory 1004. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 11 illustrates a chip set 1100 upon which an embodiment of the invention may be implemented. Chip set 1100 is programmed to provide adaptive location sampling in mobile devices as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as one or more digital signal processors (DSP) 1107, or one or more application-specific integrated circuits (ASIC) 1109. A DSP 1107 typically is configured to process real-world signals (e.g., sound) in real time independently of the processor 1103. Similarly, an ASIC 1109 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1103 and accompanying components have connectivity to the memory 1105 via the bus 1101. The memory 1105 includes both dynamic memory (e.g., RAM, magnetic disk, writable optical disk, etc.) and static memory (e.g., ROM, CD-ROM, etc.) for storing executable instructions that when executed perform the inventive steps described herein to provide adaptive location sampling in mobile devices. The memory 1105 also stores the data associated with or generated by the execution of the inventive steps.

Figure 12:
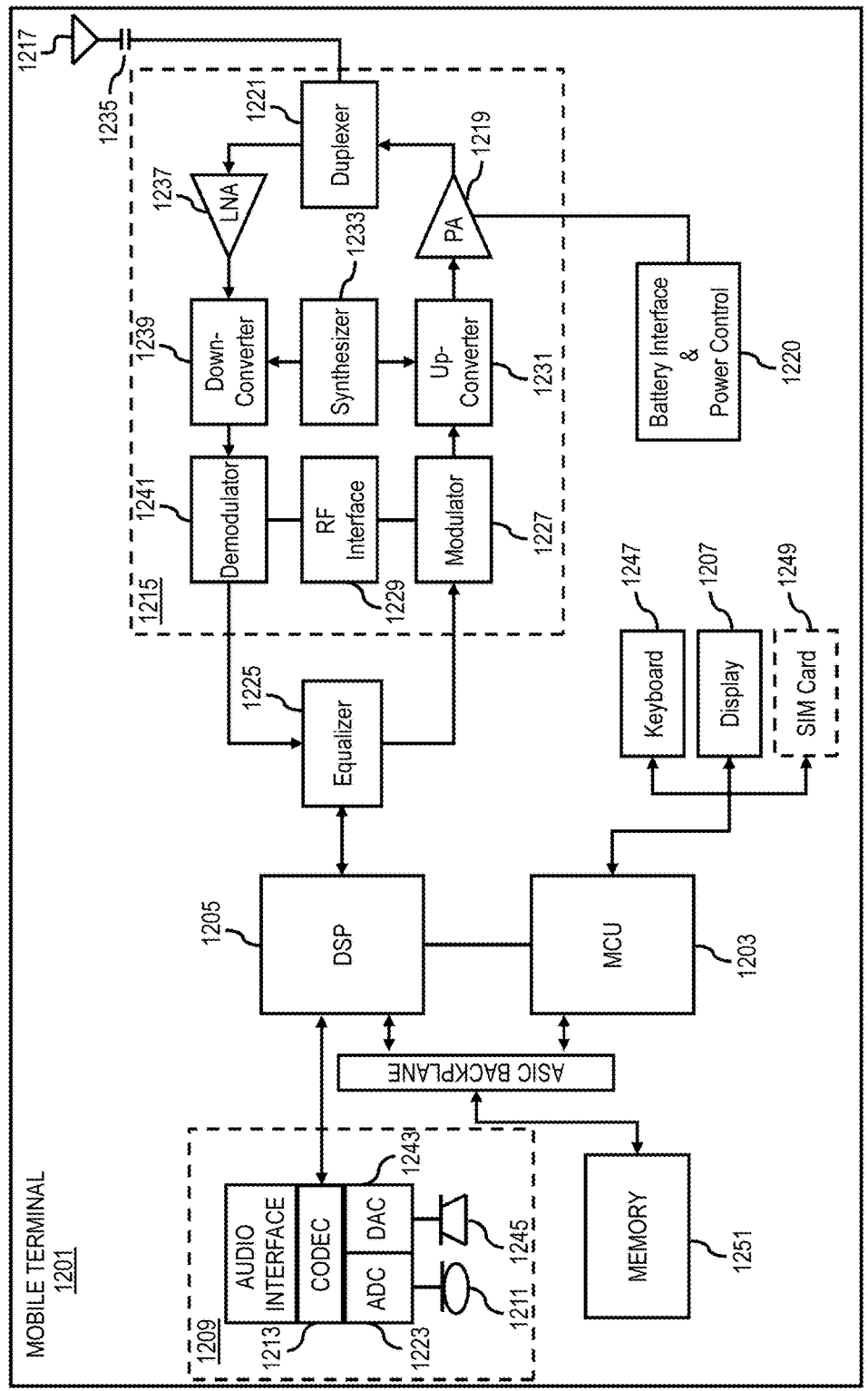
FIG. 12 is a diagram of a mobile terminal (e.g., mobile computer) that can be used to implement an embodiment of the invention.

FIG. 12 is a diagram of exemplary components of a mobile terminal 1201 (e.g., a UE 201 and/or the vehicle 203 or part thereof, like an embedded unit) capable of operating in the system of FIG. 2, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1203, a Digital Signal Processor (DSP) 1205, and a receiver/transmitter unit including a microphone gain control unit and a speaker gain control unit. A main display unit 1207 provides a display to the user in support of various applications and mobile station functions that offer automatic contact matching. An audio function circuitry 1209 includes a microphone 1211 and microphone amplifier that amplifies the speech signal output from the microphone 1211. The amplified speech signal output from the microphone 1211 is fed to a coder/decoder (CODEC) 1213.

A radio section 1215 amplifies power and converts frequency in order to communicate with a base station, which is included in a mobile communication system, via antenna 1217. The power amplifier (PA) 1219 and the transmitter/modulation circuitry are operationally responsive to the MCU 1203, with an output from the PA 1219 coupled to the duplexer 1221 or circulator or antenna switch, as known in the art. The PA 1219 also couples to a battery interface and power control unit 1220.

In use, a user of mobile station 1201 speaks into the microphone 1211 and his or her voice along with any detected background noise is converted into an analog voltage. The analog voltage is then converted into a digital signal through the Analog to Digital Converter (ADC) 1223. The control unit 1203 routes the digital signal into the DSP 1205 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1225 for compensation of any frequency-dependent impairments that occur during transmission though the air such as phase and amplitude distortion. After equalizing the bit stream, the modulator 1227 combines the signal with a RF signal generated in the RF interface 1229. The modulator 1227 generates a sine wave by way of frequency or phase modulation. In order to prepare the signal for transmission, an up-converter 1231 combines the sine wave output from the modulator 1227 with another sine wave generated by a synthesizer 1233 to achieve the desired frequency of transmission. The signal is then sent through a PA 1219 to increase the signal to an appropriate power level. In practical systems, the PA 1219 acts as a variable gain amplifier whose gain is controlled by the DSP 1205 from information received from a network base station. The signal is then filtered within the duplexer 1221 and optionally sent to an antenna coupler 1235 to match impedances to provide maximum power transfer. Finally, the signal is transmitted via antenna 1217 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1201 are received via antenna 1217 and immediately amplified by a low noise amplifier (LNA) 1237. A down-converter 1239 lowers the carrier frequency while the demodulator 1241 strips away the RF leaving only a digital bit stream. The signal then goes through the equalizer 1225 and is processed by the DSP 1205. A Digital to Analog Converter (DAC) 1243 converts the signal and the resulting output is transmitted to the user through the speaker 1245, all under control of a Main Control Unit (MCU) 1203—which can be implemented as a Central Processing Unit (CPU) (not shown).

The MCU 1203 receives various signals including input signals from the keyboard 1247. The keyboard 1247 and/or the MCU 1203 in combination with other user input components (e.g., the microphone 1211) comprise a user interface circuitry for managing user input. The MCU 1203 runs a user interface software to facilitate user control of at least some functions of the mobile station 1201 to provide adaptive location sampling in mobile devices. The MCU 1203 also delivers a display command and a switch command to the display 1207 and to the speech output switching controller, respectively. Further, the MCU 1203 exchanges information with the DSP 1205 and can access an optionally incorporated SIM card 1249 and a memory 1251. In addition, the MCU 1203 executes various control functions required of the station. The DSP 1205 may, depending upon the implementation, perform any of a variety of conventional digital processing functions on the voice signals. Additionally, DSP 1205 determines the background noise level of the local environment from the signals detected by microphone 1211 and sets the gain of microphone 1211 to a level selected to compensate for the natural tendency of the user of the mobile station 1201.

The CODEC 1213 includes the ADC 1223 and DAC 1243. The memory 1251 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1251 may be, but not limited to, a single memory, CD, DVD, ROM, RAM, EEPROM, optical storage, or any other non-volatile or non-transitory storage medium capable of storing digital data.

An optionally incorporated SIM card 1249 carries, for instance, important information, such as the cellular phone number, the carrier supplying service, subscription details, and security information. The SIM card 1249 serves primarily to identify the mobile station 1201 on a radio network.

The card 1249 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method for adaptive location sampling in a mobile device, comprising:
   determining one or more links representing a localized area of a transportation network, wherein at least some of the one or more links form a link chain;
   combining the link chain into a super link when (a) a starting node and an ending node of the link chain have a degree of freedom that is equal to one or is greater than two, and (b) a proceeding node after the starting node and a preceding node before the ending node have a degree of freedom that is equal to two, wherein the degree of freedom represents a total number of incoming links and outgoing links;
   determining a road length and a speed attribute for each link in the super link;
   calculating a travel time for the super link based on the road length and the speed attribute of said each link; and
   calculating a sampling interval for the mobile device, wherein the sampling interval is based on the travel time.

2. The method of claim 1, wherein the super link replaces said each link that is included in the super link when calculating the travel time and the sampling interval.

3. The method of claim 1, wherein the sampling interval is calculated to be smaller than the travel time for a minimal of the travel times calculated for the one or more maneuvers and the super link.

4. The method of claim 3, wherein the maneuver is defined based on a starting node, at least one intermediate node, and an ending node; and wherein there is a first link between the starting node and the at least one intermediate node, and a second link between at least one intermediate node and the ending node.

5. An apparatus for adaptive location sampling in a mobile device, comprising:
   at least one processor; and
   at least one memory including computer program code for one or more programs,
   the at least one memory and the computer program code configured to, with the at least one processor, cause the apparatus to perform at least the following,
      determine an ordered pair of nodes within a graph representing a localized area of a transportation network;
      determine respective road lengths and respective speed attributes for one or more links connecting the ordered pair of nodes;
      calculate respective travel times for one or more paths traversing the one or more links based on the respective road lengths and the respective speed attributes;
      determine a second shortest path from among the one or more paths that is associated with a second shortest travel time among the calculated respective travel times; and
      calculate a sampling frequency for the mobile device traveling in the localized area based on the second shortest travel time,
         wherein the calculated sampling frequency is further calculated based on a minimum sampling interval that is equivalent with, or less than, a minimal travel time of two adjacent links in the localized area,
         wherein the mobile device is configured to collect probe data using one or more sensors at the calculated sampling frequency while traveling in the localized area.

6. The apparatus of claim 5, wherein the apparatus is further caused to:
   calculate respective travel times for respective second shortest paths for all ordered pairs of nodes in the graph,
   setting the sampling frequency such that a corresponding sampling interval is calculated to be smaller than a minimal of the respective travel times for all the ordered pairs of nodes in the graph.

7. The apparatus of claim 5, wherein the graph includes at least one intersection node and one or more other nodes neighboring the at least one intersection node within the localized area.

8. The apparatus of claim 5, wherein each node in the ordered pair of nodes is a same node, and wherein the apparatus is further caused to:
   calculate the travel time for the ordered pair based on a shortest path from the same node to itself.

9. The apparatus of claim 5, wherein the travel time is not defined when there is no path or only one path between the ordered pair of nodes.

10. The apparatus of claim 5, wherein the apparatus is further caused to:
    store the sampling frequency in a geographic database as attribute of the ordered pair of nodes, said each link, the localized area, the transportation network, or a combination thereof.

11. An apparatus for adaptive location sampling in a mobile device, comprising:
    at least one processor; and
    at least one memory including computer program code for one or more programs,
    the at least one memory and the computer program code configured to, with the at least one processor, cause the apparatus to perform at least the following,
    determine one or more links representing a localized area of a transportation network, wherein at least some of the one or more links form a link chain;
    combine the link chain into a super link when (a) a starting node and an ending node of the link chain have a degree of freedom that is equal to one or is greater than two, and (b) a proceeding node after the starting node and a preceding node before the ending node have a degree of freedom that is equal to two, wherein the degree of freedom represents a total number of incoming links and outgoing links;
    determine a road length and a speed attribute for each link in the super link;
    calculate a travel time for the super link based on the road length and the speed attribute of said each link; and
    calculate a sampling interval for the mobile device, wherein the sampling interval is based on the travel time.

12. The apparatus of claim 11, wherein the super link replaces said each link that is included in the super link when calculating the travel time and the sampling interval.

13. The apparatus of claim 11, wherein the sampling interval is calculated to be smaller than the travel time for a minimal of the travel times calculated for the one or more maneuvers and the super link.

14. The apparatus of claim 13, wherein the maneuver is defined based on a starting node, at least one intermediate node, and an ending node; and wherein there is a first link between the starting node and the at least one intermediate node, and a second link between at least one intermediate node and the ending node.

15. A method for adaptive location sampling in a mobile device, comprising:
determining an ordered pair of nodes within a graph representing a localized area of a transportation network;
determining respective road lengths and respective speed attributes for one or more links connecting the ordered pair of nodes;
calculating respective travel times for one or more paths traversing the one or more links based on the respective road lengths and the respective speed attributes;
determining a second shortest path from among the one or more paths that is associated with a second shortest travel time among the calculated respective travel times; and
calculating a sampling frequency for the mobile device traveling in the localized area based on the second shortest travel time,
wherein the calculated sampling frequency is further calculated based on a minimum sampling interval that is equivalent with, or less than, a minimal travel time of two adjacent links in the localized area,
wherein the mobile device is configured to collect probe data using one or more sensors at the calculated sampling frequency while traveling in the localized area.

16. The method of claim 15, further comprising:
calculating respective travel times for respective second shortest paths for all ordered pairs of nodes in the graph,
setting the sampling frequency such that a corresponding sampling interval is calculated to be smaller than a minimal of the respective travel times for all the ordered pairs of nodes in the graph.

17. The method of claim 15, wherein the graph includes at least one intersection node and one or more other nodes neighboring the at least one intersection node within the localized area.

18. The method of claim 15, wherein each node in the ordered pair of nodes is a same node, the method further comprising:
calculating the travel time for the ordered pair based on a shortest path from the same node to itself.

19. The method of claim 15, wherein the travel time is not defined when there is no path or only one path between the ordered pair of nodes.

20. The method of claim 15, further comprising:
storing the sampling frequency in a geographic database as attribute of the ordered pair of nodes, said each link, the localized area, the transportation network, or a combination thereof.

* * * * *